United States Patent
Kawamoto et al.

(10) Patent No.: US 9,530,249 B2
(45) Date of Patent: Dec. 27, 2016

(54) COMPUTER-READABLE STORAGE MEDIUM HAVING IMAGE PROCESSING PROGRAM STORED THEREIN, IMAGE PROCESSING APPARATUS, IMAGE PROCESSING SYSTEM, AND IMAGE PROCESSING METHOD

(75) Inventors: Kouichi Kawamoto, Kyoto (JP); Shinya Fujiwara, Kyoto (JP); Yuuki Nishimura, Kai (JP)

(73) Assignees: NINTENDO CO., LTD., Kyoto (JP); HAL LABORATORY INC., Tokyo (JP)

( * ) Notice: Subject to any disclaimer, the term of this patent is extended or adjusted under 35 U.S.C. 154(b) by 866 days.

(21) Appl. No.: 13/053,713

(22) Filed: Mar. 22, 2011

(65) Prior Publication Data

US 2012/0075424 A1 Mar. 29, 2012

(30) Foreign Application Priority Data

Sep. 24, 2010 (JP) .................... 2010-214046

(51) Int. Cl.
*H04N 13/02* (2006.01)
*H04N 5/262* (2006.01)
(Continued)

(52) U.S. Cl.
CPC .......... *G06T 19/006* (2013.01); *G06T 7/0042* (2013.01); *H04N 13/004* (2013.01);
(Continued)

(58) Field of Classification Search
CPC ............... A63F 2300/6676; A63F 2300/69; G06T 19/006; G06T 2207/10012; G06T 2207/30204; G06T 7/0042; H04N 13/004; H04N 13/0239; H04N 13/0452
(Continued)

(56) References Cited

U.S. PATENT DOCUMENTS 6,205,240 B1 * 3/2001 Pietrzak et al. .............. 382/152
6,243,096 B1   6/2001 Takanashi
(Continued)

FOREIGN PATENT DOCUMENTS

JP    8-77231     3/1996
JP    09-251553   9/1997
(Continued)

OTHER PUBLICATIONS

Manabu, Graphics Technology Now! No. 8, GW, Japan, IDG Communications, Inc., Oct. 1, 1998, vol. 1, No. 6, pp. 128-131, with a partial English translation, 5 pages.

*Primary Examiner* — Christopher S Kelley
*Assistant Examiner* — Deirdre Beasley
(74) *Attorney, Agent, or Firm* — Nixon & Vanderhye P.C.

(57) ABSTRACT

When an image of a marker existing in a real space is taken by using an outer camera, an image of a plurality of virtual characters which is taken by a virtual camera is displayed on an upper LCD so as to be superimposed on a taken real image of the real space. The virtual characters are located in a marker coordinate system based on the marker, and when a button operation is performed by a user on a game apparatus, the position and the orientation of each virtual character are changed. Then, when a button operation indicating a photographing instruction is provided by the user, an image being displayed is stored in a storage means.

18 Claims, 18 Drawing Sheets

(51) Int. Cl.
*G06T 19/00* (2011.01)
*H04N 13/00* (2006.01)
*H04N 13/04* (2006.01)
*G06T 7/00* (2006.01)

(52) U.S. Cl.
CPC ..... *H04N 13/0239* (2013.01); *H04N 13/0452* (2013.01); *A63F 2300/6676* (2013.01); *A63F 2300/69* (2013.01); *G06T 2207/10012* (2013.01); *G06T 2207/30204* (2013.01)

(58) Field of Classification Search
USPC ... 348/46, 239, E13.074, E5.051; 345/8, 46, 345/633
See application file for complete search history.

(56) References Cited

U.S. PATENT DOCUMENTS

| | | | |
|---|---|---|---|
| 6,781,598 B1 | 8/2004 | Yamamoto et al. | |
| 7,519,218 B2* | 4/2009 | Takemoto et al. | 382/165 |
| 7,991,220 B2* | 8/2011 | Nagai et al. | 382/154 |
| 8,418,924 B2* | 4/2013 | Hepworth et al. | 235/454 |
| 2002/0060648 A1* | 5/2002 | Matsui et al. | 345/8 |
| 2006/0203085 A1* | 9/2006 | Tomita | 348/51 |
| 2008/0246757 A1* | 10/2008 | Ito | 345/419 |
| 2008/0266386 A1* | 10/2008 | Maeda | 348/47 |
| 2009/0195650 A1* | 8/2009 | Hanai et al. | 348/143 |
| 2010/0304857 A1* | 12/2010 | Suzuki et al. | 463/31 |
| 2011/0169861 A1* | 7/2011 | Suzuki et al. | 345/632 |
| 2011/0242134 A1* | 10/2011 | Miller et al. | 345/633 |
| 2011/0304703 A1* | 12/2011 | Ito | 348/47 |
| 2012/0075285 A1* | 3/2012 | Oyagi et al. | 345/419 |
| 2012/0176409 A1* | 7/2012 | Noge | 345/633 |
| 2012/0257788 A1* | 10/2012 | Ogasawara et al. | 382/103 |

FOREIGN PATENT DOCUMENTS

| | | | |
|---|---|---|---|
| JP | 10-51711 | | 2/1998 |
| JP | 11-88913 | | 3/1999 |
| JP | 11-120384 | | 4/1999 |
| JP | 2001-155177 | | 6/2001 |
| JP | 2004-329708 | | 11/2004 |
| JP | 2005-100185 | | 4/2005 |
| JP | 2005-261642 | | 9/2005 |
| JP | 2006-271658 | | 10/2006 |
| JP | 2006-285609 | | 10/2006 |
| JP | 2007-282861 | | 11/2007 |
| JP | 2008146109 A | * | 6/2008 |
| JP | 2009025918 A | * | 2/2009 |
| JP | 2009-267662 | | 11/2009 |
| JP | 2009-290842 | | 12/2009 |

* cited by examiner

MARKER COORDINATE SYSTEM

COMPUTER-READABLE STORAGE MEDIUM HAVING IMAGE PROCESSING PROGRAM STORED THEREIN, IMAGE PROCESSING APPARATUS, IMAGE PROCESSING SYSTEM, AND IMAGE PROCESSING METHOD

CROSS REFERENCE TO RELATED APPLICATION

The disclosure of Japanese Patent Application No. 2010-214046, filed on Sep. 24, 2010, is incorporated herein by reference.

FIELD

The present invention relates to a computer-readable storage medium having an image processing program stored therein, an image processing apparatus, an image processing system, and an image processing method, which generate an image in which a virtual object is superimposed on an image taken by a real camera.

BACKGROUND AND SUMMARY

Conventionally, there is an image synthesizing apparatus which synthesizes an image of a virtual object with an image taken by a real camera (for example, Japanese Laid-Open Patent Publication No. 2009-290842, hereinafter, referred to as Patent Document 1). Specifically, in the apparatus described in Patent Document 1, an object in a taken image is detected, and a type and a synthesized state of a virtual object are determined in accordance with the type and the state of the detected object. Then, a synthesized image in which an image of the virtual object is synthesized with the taken image, is generated. When a photographing instruction is provided by a user, the synthesized image is recorded.

However, in Patent Document 1, an image of a virtual object of which a size and an orientation are set previously is merely synthesized with a taken image, and a picture taken by the apparatus of Patent Document 1 does not provide, to the user, a feeling as if the virtual object exists in a real space.

Therefore, an object of the present invention is to provide an image processing technique to take an image which can provide, to a user, a feeling as if a virtual object exists in a real space.

The present invention has the following features to attain the object mentioned above.

One embodiment of the present invention provides a computer-readable storage medium having stored therein an image processing program which is executed by a computer of an image processing apparatus which generates an image in which a virtual object image is superimposed on an image taken by a real camera. The image processing program causes the computer to operate as real image obtaining means, position/orientation information obtaining means, virtual camera setting means, virtual object change means, virtual object image generation means, superimposed image generation means, and storing means. The real image obtaining means obtains a real image of an object which is taken by the real camera. The position/orientation information obtaining means obtains position/orientation information corresponding to a position and an orientation of the real camera in a real space. The virtual camera setting means sets a position and an orientation of a virtual camera in a virtual space on the basis of the position/orientation information obtained by the position/orientation information obtaining means. The virtual object change means changes at least one of a position and an orientation of at least a part of a virtual object located in the virtual space, in accordance with an input performed by a user on input means. The virtual object image generation means generates a virtual object image by taking, by the virtual camera, an image of the virtual object of which the at least one of the position and the orientation has been changed by the virtual object change means. The superimposed image generation means generates a superimposed image in which the virtual object image generated by the virtual object image generation means is superimposed on the real image obtained by the real image obtaining means. The storing means stores the superimposed image in storage means in accordance with a photographing instruction provided by the user.

Note that the position/orientation information, which is obtained by the position/orientation information obtaining means and corresponds to the position and the orientation of the real camera, may be relative position and orientation between a predetermined object existing in the real space and the real camera. In other words, the position/orientation information may be a position and an orientation of the real camera which are based on the predetermined object in the real space, or may be a position and an orientation of the predetermined object in the real space which are based on the real camera. In addition, the position/orientation information may be absolute position and orientation of the real camera which are detected by means for detecting an absolute position (e.g., a GPS) and orientation detection means (e.g., an angular velocity sensor, an acceleration sensor, means for detecting a geomagnetism, or the like).

According to the above, the user can operate the virtual object in the virtual space, and can generate and store a superimposed image in which the operated virtual object is superimposed on a real image. Thus, an image can be taken which can provide, to the user, a feeling as if the virtual object exists in the real space.

In another feature of the present invention, the position/orientation information obtaining means may detect a specific object included in the real image obtained by the real image obtaining means, and may obtain a relative position and a relative orientation of the real camera with respect to the specific object on the basis of a result of the detection.

According to the above, on the basis of the specific object included in the real image taken by the real camera, the relative position and orientation between the specific object in the real space and the real camera can be obtained.

In still another feature of the present invention, the image processing apparatus may be connectable to display means. Until the photographing instruction is provided, the superimposed image generation means repeatedly generates the superimposed image in which the real image obtained by the real image obtaining means and the virtual object image generated by the virtual object image generation means. Then, the image processing program further causes the computer to operate as display control means. The display control means causes the display means to display thereof the superimposed image generated by the superimposed image generation means until the photographing instruction is provided.

According to the above, the superimposed image can be displayed on the display means until the photographing instruction is provided by the user. Thus, the user can confirm the superimposed image which is to be taken (stored).

In still another feature of the present invention, the virtual object may include a first part and a second part. In this case, the virtual object change means includes part change means for changing an orientation of the first part such that the first part of the virtual object is turned to the virtual camera, in accordance with an input performed by the user on the input means.

According to the above, the orientation of the first part can be changed such that the first part of the virtual object is turned to the virtual camera. For example, the face of the virtual object can be turned to the virtual camera, and a feeling as if the virtual object exists in the real space can be provided to the user.

In still another feature of the present invention, when the orientation of the first part is changed such that the first part is turned to the virtual camera, if an orientation of the first part based on the second part is out of a first range, the part change means may set the orientation of the first part to an upper limit or a lower limit of the first range.

According to the above, the orientation of the first part with respect to the second part can be limited within the first range. For example, when the body and the face of the virtual object are defined, the direction of the face can be controlled such that the direction of the face is prevented from being unnatural with respect to the direction of the body.

In still another feature of the present invention, when an input is performed by the user on the input means, the part change means repeatedly may change the orientation of the first part such that the first part of the virtual object is turned to the virtual camera, until the photographing instruction is provided.

According to the above, when the user performs an input, the orientation of the first part is changed such that the first part of the virtual object is always turned to the virtual camera, until the photographing instruction is provided. Thus, a wasteful input can be omitted.

In still another feature of the present invention, the real camera may be a stereo camera. The real image obtaining means obtains a real image for a left eye, which is taken by a real camera for a left eye of the stereo camera, and a real image for a right eye, which is taken by a real camera for a right eye of the stereo camera. The position/orientation information obtaining means obtains position/orientation information corresponding to a position and an orientation of each of the real camera for left eye and the real camera for a right eye of the stereo camera. The virtual camera setting means sets a position and an orientation of a left virtual camera in accordance with the position/orientation information of the real camera for a left eye which is obtained by the position/orientation information obtaining means, and sets a position and an orientation of a right virtual camera in accordance with the position/orientation information of the real camera for a right eye which is obtained by the position/orientation information obtaining means. The part change means changes the orientation of the first part such that the first part of the virtual object is turned to a midpoint between the left virtual camera and the right virtual camera. The virtual object image generation means generates a virtual object image for a left eye and a virtual object image for a right eye by taking, by the left virtual camera and the right virtual camera, images of the virtual object of which the orientation of the first part has been changed by the part change means. The superimposed image generation means generates a superimposed image for a left eye in which the virtual object image for a left eye is superimposed on the real image for a left eye, and a superimposed image for a right eye in which the virtual object image for a right eye is superimposed on the real image for a right eye.

According to the above, a stereoscopic image in which the virtual object is superimposed on a taken image of the real space can be generated. In this case, the first part of the virtual object can be turned to the left and right virtual cameras. Thus, the user can taken a stereoscopic image, and can obtain enhanced augmented reality.

In still another feature of the present invention, the virtual object change means may include moving means for moving the virtual object in accordance with an input performed by the user on the input means.

According to the above, the user can move the virtual object in the virtual space, and can obtain a feeling as if the virtual object moves in the real space.

In still another feature of the present invention, the virtual object change means may include moving means for moving, in accordance with an input performed by the user on the input means, the virtual object such that a moving direction of the virtual object on the display means is the same as a direction of the input.

According to the above, the direction of the input on the input means agrees with the moving direction in a display. Thus, the user can move the virtual object in a desired direction by an intuitive operation.

In still another feature of the present invention, if a position of the virtual object is out of a second range in the virtual space when the virtual object is moved in accordance with the input performed by the user on the input means, the moving means may correct the position of the virtual object to be within the second range.

According to the above, a movement range of the virtual object can be limited.

In still another feature of the present invention, the virtual object change means may include pose change means for changing a pose of the virtual object in accordance with an input performed by the user on the input means.

According to the above, the user can change the pose of the virtual object, and can obtain a feeling as if the virtual object exists in the real space.

In still another feature of the present invention, the image processing program may further cause the computer to operate as selection means. The selection means selects one virtual object from among a plurality of virtual objects located in the virtual space. Then, the virtual object change means changes at least one of a position and an orientation of at least a part of the virtual object selected by the selection means, in accordance with an input performed by the user on the input means.

According to the above, the user can select a virtual object and can change the position or the orientation of at least a part of the selected virtual object.

In still another feature of the present invention, the image processing program may further cause the computer to operate as selection means. The selection means selects one virtual object from among a plurality of virtual objects located in the virtual space. The superimposed image generation means generates a superimposed image in which a cursor indicating that the virtual object is selected by the selection means is further superimposed. The virtual object change means changes at least one of a position and an orientation of at least a part of the virtual object selected by the selection means, in accordance with an input performed by the user on the input means. In accordance with a photographing instruction provided by the user, the storing means sets the cursor to be non-displayed and stores the superimposed image in the storage means.

According to the above, until the superimposed image is stored in accordance with the photographing instruction, the user can select and change a virtual object while confirming a superimposed image displayed on the display means. In addition, since the cursor is superimposed and displayed on the display means, the user can confirm the selected virtual object. Moreover, when the superimposed image is stored, the cursor can be set to be non-displayed, and a picture can be taken in which the virtual object appears as if existing in the real space.

In another embodiment, an image processing apparatus implementing the above respective means may be configured. In still another embodiment, a plurality of elements implementing the above respective means may be configured as one image processing system by mutually operating. The image processing system may be constituted of one apparatus or a plurality of apparatuses.

According to the present invention, an image can be taken which provides, to the user, a feeling as if the virtual object exists in the real space.

These and other objects, features, aspects and advantages of the present invention will become more apparent from the following detailed description of the present invention when taken in conjunction with the accompanying drawings.

BRIEF DESCRIPTION OF THE DRAWINGS

FIG. 17 is a diagram illustrating a positional relation between the marker 61 and an outer imaging section (left) 23a;

DESCRIPTION OF THE PREFERRED EMBODIMENTS (Structure of Game Apparatus)

Figure 1:
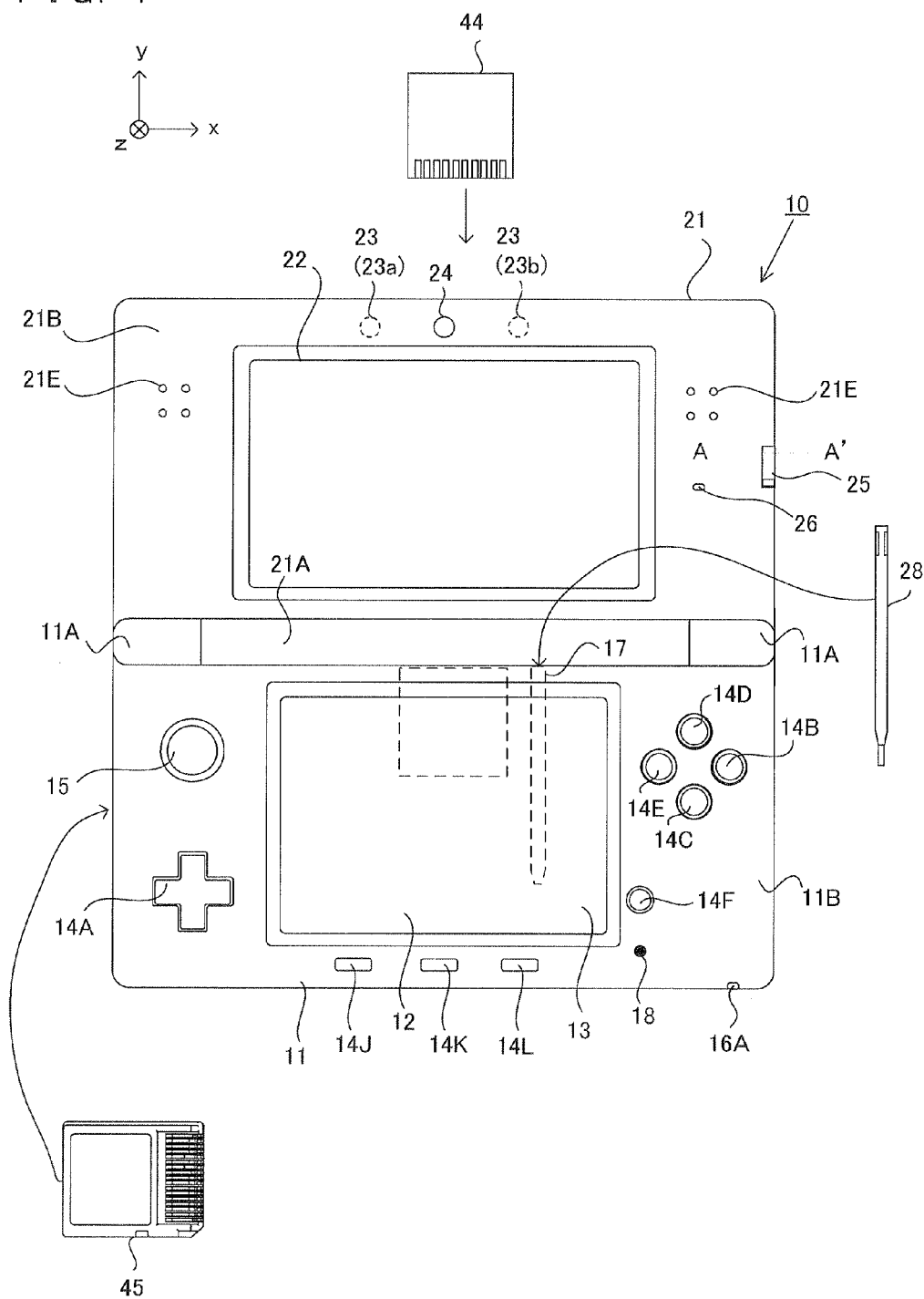
FIG. 1 is a front view of a game apparatus 10 in its opened state.
Figure 2:
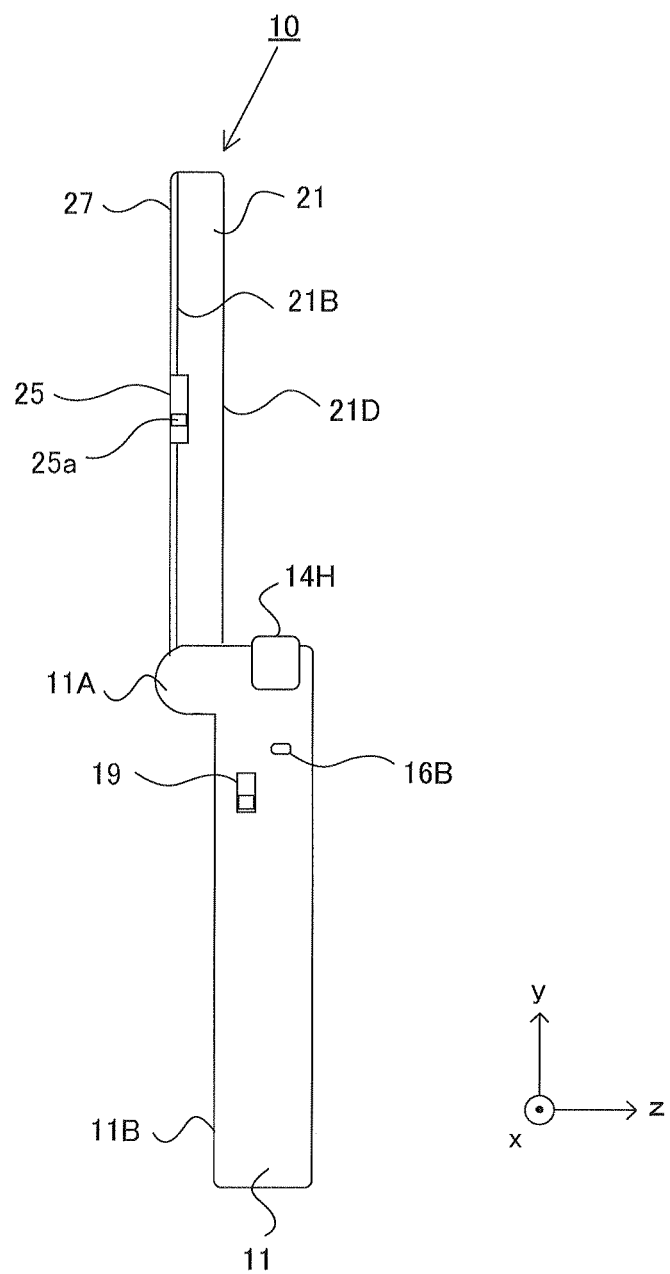
FIG. 2 is a right side view of the game apparatus 10 in its opened state.
Figure 3:
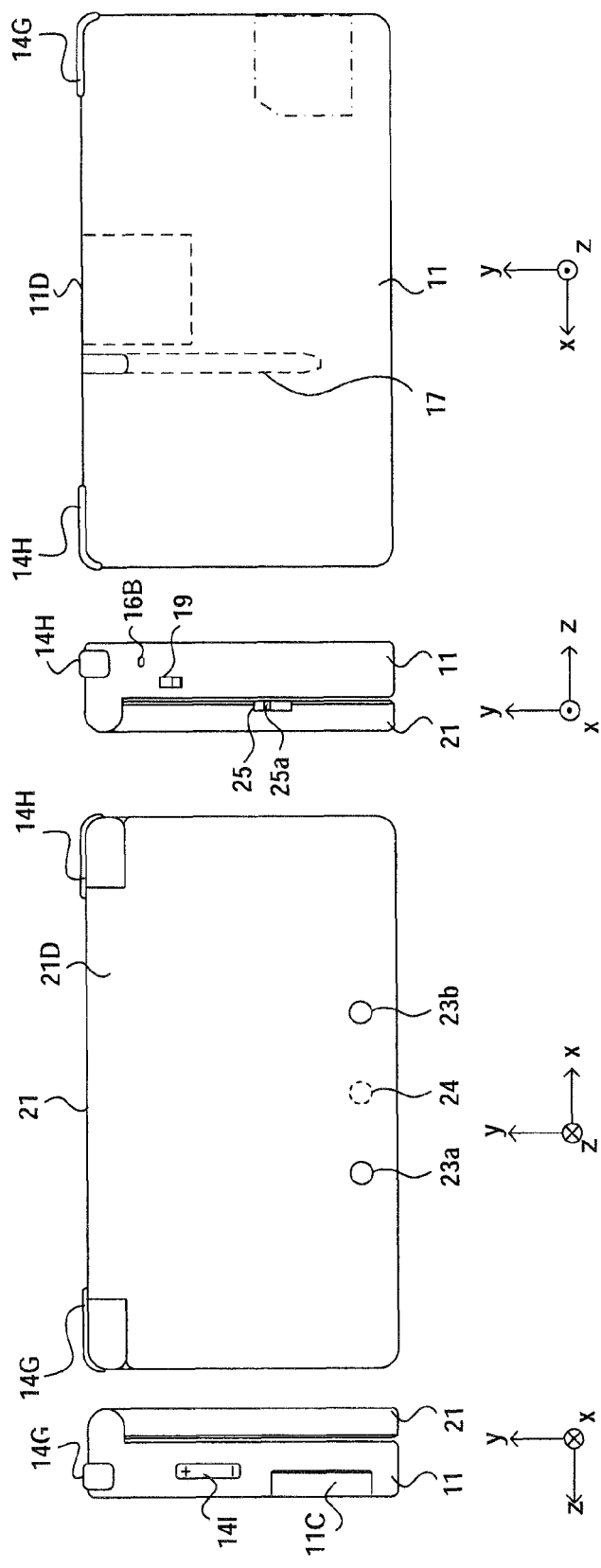
FIG. 3A is a left side view of the game apparatus 10 in its closed state.
FIG. 3B is a front side view of the game apparatus 10 in its closed state.
FIG. 3C is a right side view of the game apparatus 10 in its closed state.
FIG. 3D is a rear side view of the game apparatus 10 in its closed state.

Hereinafter, a game apparatus according to one embodiment of the present invention will be described. FIG. 1 to FIG. 3 are each a plan view of an outer appearance of a game apparatus 10. The game apparatus 10 is a hand-held game apparatus, and is configured to be foldable as shown in FIG. 1 to FIG. 3. FIG. 1 and FIG. 2 show the game apparatus 10 in an opened state, and FIG. 3 shows the game apparatus 10 in a closed state. FIG. 1 is a front view of the game apparatus 10 in the opened state, and FIG. 2 is a right side view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 to FIG. 3. The game apparatus 10 includes a lower housing 11 and an upper housing 21 as shown in FIG. 1 to FIG. 3. The lower housing 11 and the upper housing 21 are connected to each other so as to be openable and closable (foldable). In the present embodiment, the lower housing 11 and the upper housing 21 are each formed in a horizontally long plate-like rectangular shape, and are connected to each other at long side portions thereof so as to be pivotable with respect to each other.

As shown in FIG. 1 and FIG. 2, projections 11A each of which projects in a direction orthogonal to an inner side surface (main surface) 11B of the lower housing 11 are provided at the upper long side portion of the lower housing 11, whereas a projection 21A which projects from the lower side surface of the upper housing 21 in a direction orthogonal to the lower side surface of the upper housing 21 is provided at the lower long side portion of the upper housing 21. Since the projections 11A of the lower housing 11 and the projection 21A of the upper housing 21 are connected to each other, the lower housing 11 and the upper housing 21 are foldably connected to each other.

(Description of Lower Housing)

Initially, a structure of the lower housing 11 will be described. As shown in FIG. 1 to FIG. 3, in the lower housing 11, a lower LCD (Liquid Crystal Display) 12, a touch panel 13, operation buttons 14A to 14L (FIG. 1, FIG. 3), an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening of the lower housing 11. When the game apparatus 10 is not used, the game apparatus 10 is in the closed state, thereby preventing the screen of the lower LCD 12 from becoming unclean and damaged. The number of pixels of the lower LCD 12 may be, for example, 256 dots×192 dots (the longitudinal line× the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 3D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), an A button 14B, a B button 14C, an X button 14D, a Y button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The buttons 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD 12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Four buttons, that is, the A button 14B, the B button 14C, the X button 14D, and the Y button 14E, which are positioned so as to form a cross shape, are positioned such that a thumb of a right hand with which the lower housing 11 is held is naturally positioned on the positions of the four buttons. Further, the four buttons and the analog stick 15 sandwich the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone (see FIG. 4) is provided as a sound input device described below, and the microphone detects for a sound from the outside of the game apparatus 10.

FIG. 3A is a left side view of the game apparatus 10 in the closed state. FIG. 3B is a front view of the game apparatus 10 in the closed state. FIG. 3C is a right side view of the game apparatus 10 in the closed state. FIG. 3D is a rear view of the game apparatus 10 in the closed state. As shown in FIG. 3B and FIG. 3D, an L button 14G and an R button 14H are provided on the upper side surface of the lower housing 11 The L button 14G is positioned on the left end portion of the upper side surface of the lower housing 11 and the R button 14H is positioned on the right end portion of the upper side surface of the lower housing 11. Further, as shown in FIG. 3A, a sound volume button 14I is provided on the left side surface of the lower housing 11. The sound volume button 14I is used for adjusting a sound volume of a speaker of the game apparatus 10.

As shown in FIG. 3A, a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10. The connector and the cover section 11C may be provided on the right side surface of the lower housing 11.

Further, as shown in FIG. 3D, an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening 11D may be provided on another side surface (for example, the right side surface) of the lower housing 11.

Further, as shown in FIG. 1 and FIG. 3C, a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 3C).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 3, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

The screen of the upper LCD 22 is provided on the inner side surface (main surface) 21B of the upper housing 21, and the screen of the upper LCD 22 is exposed at an opening of the upper housing 21. Further, as shown in FIG. 2, the inner side surface of the upper housing 21 is covered with a transparent screen cover 27. The screen cover 27 protects the screen of the upper LCD 22, and integrates the upper LCD 22 and the inner side surface of the upper housing 21 with each other, thereby achieving unity. The number of pixels of the upper LCD 22 may be, for example, 640 dots×200 dots (the horizontal line× the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image (stereoscopic image). Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed for a predetermined time period may be used. Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. Further, these imaging sections are each designed so as to be positioned in a direction which is opposite to the normal direction of the display surface (inner side surface) of the upper LCD 22 by 180 degrees. Specifically, the imaging direction of the outer imaging section (left) 23a and the imaging direction of the outer imaging section (right) 23b are parallel to each other. The outer imaging section (left) 23a and the outer imaging section (right) 23b can be used as a stereo camera depending on a program executed by the game apparatus 10. Further, depending on a program, when any one of the two outer imaging sections (23a and 23b) is used alone, the outer imaging section 23 may be used as a non-stereo camera. Further, depending on a program, images taken by the two outer imaging sections (23a and 23b) may be combined with each other or may compensate for each other, thereby enabling imaging using an extended imaging range. In the present embodiment, the outer imaging section 23 is structured so as to include two imaging sections, that is, the outer imaging section (left) 23a and the outer imaging section (right) 23b. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

As indicated by dashed lines in FIG. 1 and by solid lines in FIG. 3B, the outer imaging section (left) 23a and the outer imaging section (right) 23b forming the outer imaging section 23 are aligned so as to be parallel to the horizontal direction of the screen of the upper LCD 22. Specifically, the outer imaging section (left) 23a and the outer imaging section (right) 23b are positioned such that a straight line connecting between the two imaging sections is parallel to the horizontal direction of the screen of the upper LCD 22. Reference numerals 23a and 23b which are indicated as dashed lines in FIG. 1 represent the outer imaging section (left) 23a and the outer imaging section (right) 23b, respectively, which are positioned on the outer side surface reverse of the inner side surface of the upper housing 21. As shown in FIG. 1, when a user views the screen of the upper LCD 22 from the front thereof, the outer imaging section (left) 23a is positioned to the left of the upper LCD 22 and the outer imaging section (right) 23b is positioned to the right of the upper LCD 22. When a program for causing the outer imaging section 23 to function as a stereo camera is executed, the outer imaging section (left) 23a takes an image for a left eye, which is viewed by a left eye of a user, and the outer imaging section (right) 23b takes an image for a right eye, which is viewed by a right eye of the user. A distance between the outer imaging section (left) 23a and the outer imaging section (right) 23b is set so as to be approximately the same as a distance between both eyes of a person, that is, may be set so as to be within a range from 30 mm to 70 mm, for example. However, the distance between the outer imaging section (left) 23a and the outer imaging section (right) 23b is not limited to a distance within the range described above.

In the present embodiment, the outer imaging section (left) 23a and the outer imaging section (right) 23b are secured to the housing, and the imaging directions thereof cannot be changed.

Further, the outer imaging section (left) 23a and the outer imaging section (right) 23b are positioned to the left and to the right, respectively, of the upper LCD 22 (on the left side and the right side, respectively, of the upper housing 21) so as to be horizontally symmetrical with respect to the center of the upper LCD 22. Specifically, the outer imaging section (left) 23a and the outer imaging section (right) 23b are positioned so as to be symmetrical with respect to a line which divides the upper LCD 22 into two equal parts, that is, the left part and the right part. Further, the outer imaging section (left) 23a and the outer imaging section (right) 23b are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer imaging section (left) 23a and the outer imaging section (right) 23b are positioned, on the outer side surface of the upper housing 21, at a position above the upper edge of the screen of the upper LCD 22 having been projected.

As described above, the two imaging sections (23a and 23b) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1 and FIG. 3B, the inner imaging section 24 is positioned on the inner side surface of the upper housing 21 at a position reverse of the middle position between the left and the right imaging sections (the outer imaging section (left) 23a and the outer imaging section (right) 23b) of the outer imaging section 23. Specifically, when the left and the right imaging sections of the outer imaging section 23 provided on the outer side surface of the upper housing 21 are projected on the inner side surface of the upper housing 21, the inner imaging section 24 is positioned at the middle position between the left and the right imaging sections having been projected. The dashed line 24 indicated in FIG. 3B represents the inner imaging section 24 positioned on the inner side surface of the upper housing 21.

As described above, the inner imaging section 24 is used for taking an image in the direction opposite to that of the outer imaging section 23. The inner imaging section 24 is positioned on the inner side surface of the upper housing 21 at a position reverse of the middle position between the left and the right imaging sections of the outer imaging section 23. Thus, when a user views the upper LCD 22 from the front thereof, the inner imaging section 24 can take an image of a face of the user from the front thereof. Further, the left and the right imaging sections of the outer imaging section 23 do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIG. 1 to FIG. 3, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. Further, an operation section of the 3D adjustment switch 25 projects on the inner side surface and the right side surface, and can be viewed and operated from both sides. All the switches other than the 3D adjustment switch 25 are provided on the lower housing 11.

The 3D adjustment switch 25 is provided so as to be visible from the front surface and the right side surface of the upper housing 21 as shown in FIG. 1 and FIG. 2. A slider 25a of the 3D adjustment switch 25 is slidable to any position in a predetermined direction (along the longitudinal direction of the right side surface), and a display mode of the upper LCD 22 may be determined in accordance with the position of the slider 25a or the stereoscopic effect of a stereoscopic image may be adjusted in accordance with the position of the slider 25a. For example, an inter-camera distance of a later-described virtual camera (virtual stereo camera) may be determined in accordance with the position of the slider 25a of the 3D adjustment switch 25. In addition, the positional relation between: an image for a left eye which is taken by a left virtual camera of the virtual stereo camera; and an image for a right eye which is taken by a right virtual camera of the virtual stereo camera, may be adjusted. Specifically, for example, when the slider 25a of the 3D adjustment switch 25 is located at the uppermost position (in the upward direction in FIG. 1 and FIG. 2), an amount of deviation in the horizontal direction (the horizontal direction of the screen of the upper LCD 22; the left-right direction in FIG. 1) between the position of the image for a left eye and the position of the image for a right eye is set to an upper limit. When the amount of deviation in the horizontal direction between the position of the image for a left eye and the position of the image for a right eye is set to the upper limit as described above, the parallax between the two images becomes great. Thus, when the user looks at the two images displayed on the upper LCD 22, through the parallax barrier, the user can see an image as if being projecting from the screen of the upper LCD 22. In this manner, the parallax between two images may be adjusted by using the 3D adjustment switch 25.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed in a state where the upper LCD 22 is in the stereoscopic display mode. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 43 described below.

(Internal Configuration of Game Apparatus 10)

Figure 4:
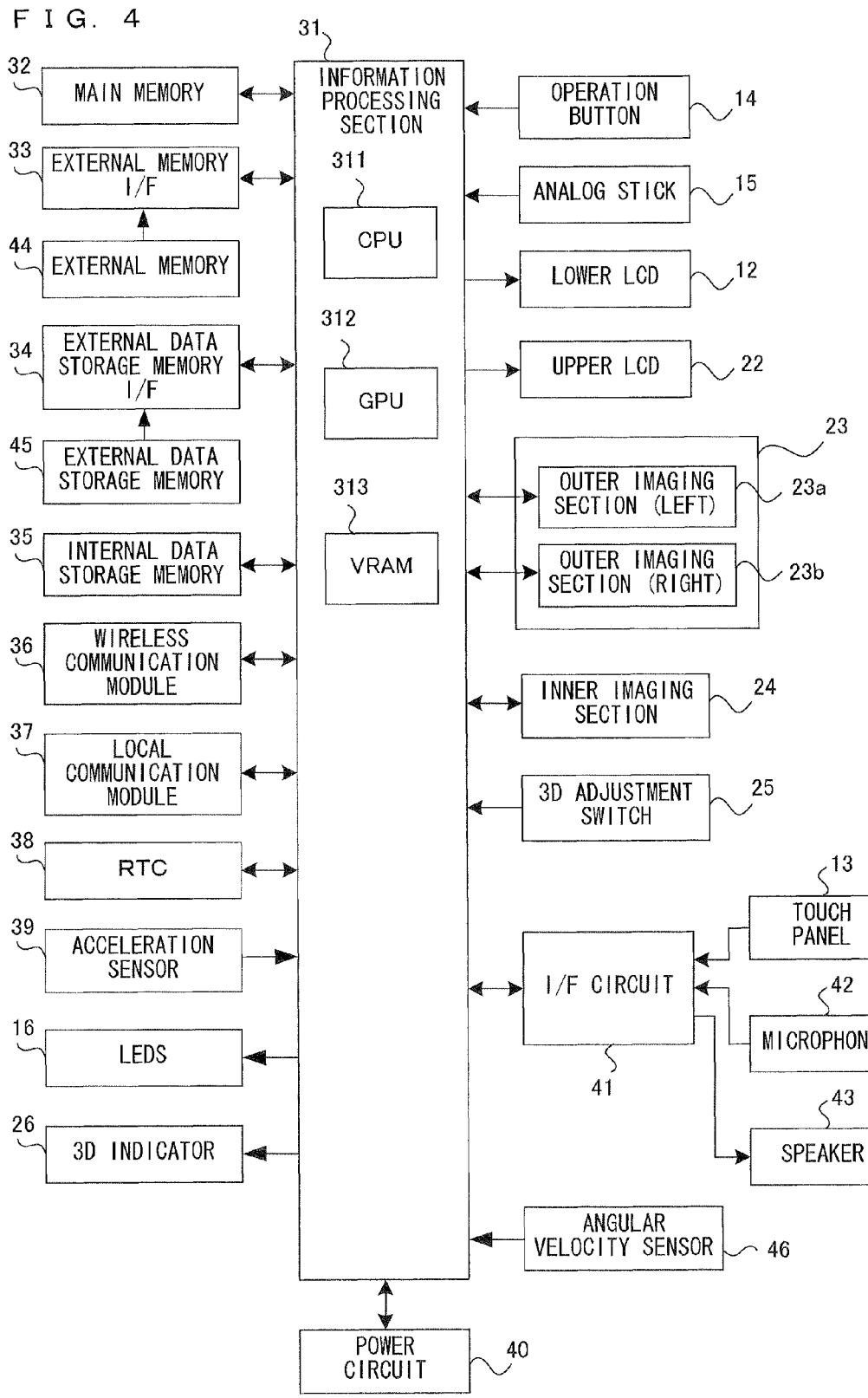
FIG. 4 is a block diagram illustrating an internal configuration of the game apparatus 10.

Next, an internal electrical configuration of the game apparatus 10 will be described with reference to FIG. 4. FIG. 4 is a block diagram illustrating an internal configuration of the game apparatus 10. As shown in FIG. 4, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the present embodiment, a predetermined program is stored in a memory (for example, the external memory 44 connected to the external memory I/F 33 or the internal data storage memory 35) inside the game apparatus 10. The CPU 311 of the information processing section 31 executes a later-described process (FIG. 12) by executing the predetermined program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the image processing, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 receives data (acceleration data) representing accelerations detected by the acceleration sensor 39, and detects an orientation and a motion of the game apparatus 10. In the present embodiment, the information processing section 31 determines the orientation (tilt) of the game apparatus 10 on the basis of the accelerations detected by the acceleration sensor 39.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31.

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye, which are stored in the VRAM 313 of the information processing section 31, are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31. For example, the information processing section 31 issues an instruction for taking an image to one of the outer imaging section 23 or the inner imaging section 24, and the imaging section which receives the instruction for taking an image takes an image and transmits data of the taken image to the information processing section 31. For example, a user selects the imaging section to be used through a touch operation using the touch panel 13. When the information processing section 31 (the CPU 311) detects that the imaging section is selected, the information processing section 31 instructs one of the outer imaging section 32 or the inner imaging section 24 to take an image.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. In the present embodiment, the information processing section 31 lights up the 3D indicator 26 when the upper LCD 22 is in the stereoscopic display mode. The game apparatus 10 has the internal configuration as described above.

To the information processing section 31, an angular velocity sensor 46 is connected. The angular velocity sensor 46 detects an angular velocity about each axis (an x axis, a y axis, and a z axis). The game apparatus 10 can calculate the orientation of the game apparatus 10 in a real space on the basis of the angular velocities detected sequentially by the angular velocity sensor 46. Specifically, the game apparatus 10 can calculate an angle of rotation of the game apparatus 10 about each axis by integrating the angular velocity about each axis, which is detected by the angular velocity sensor 46, over time.

(Outline of Photographing Process)

Figure 5:
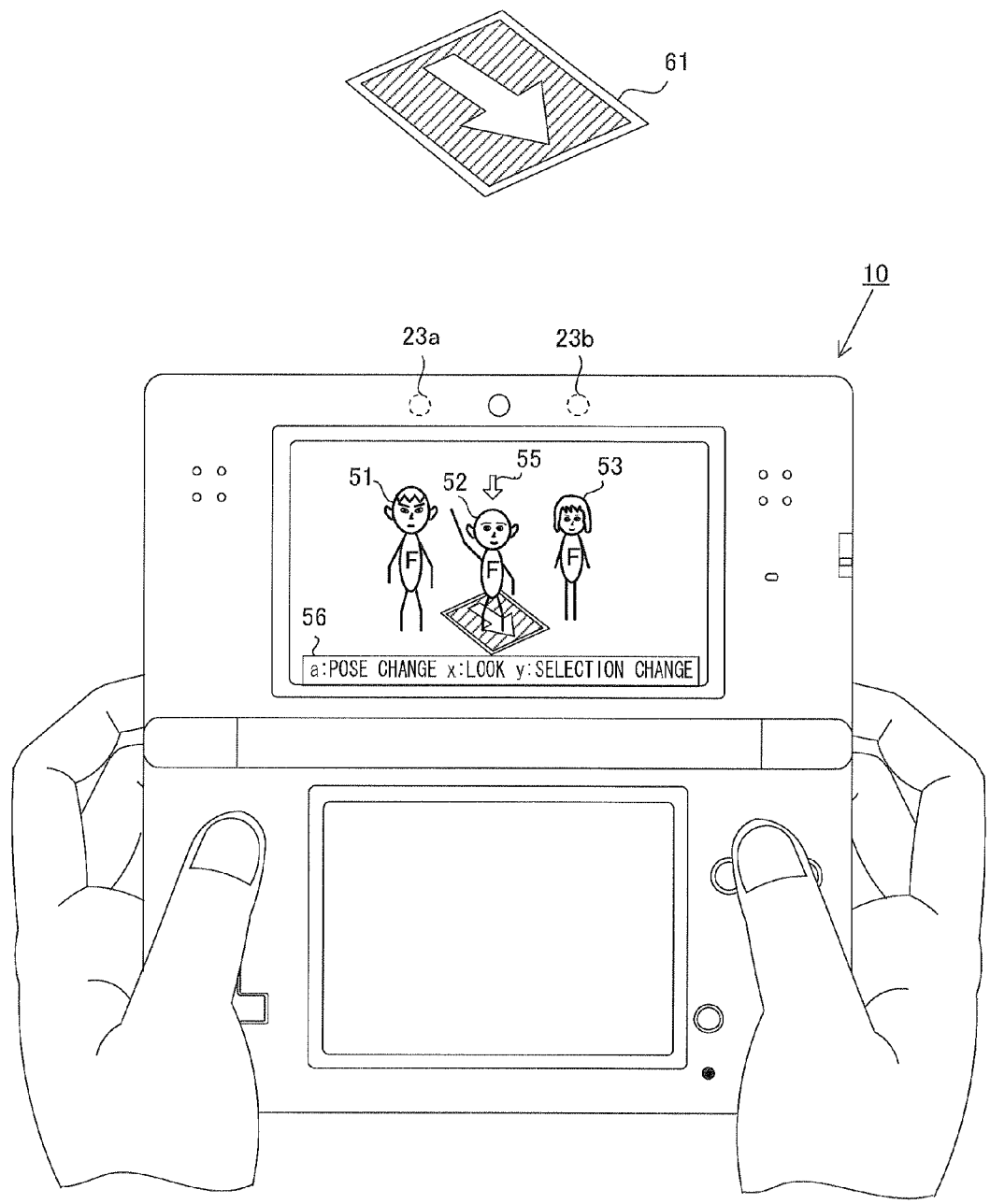
FIG. 5 is a diagram illustrating an example of an image which is displayed on an upper LCD 22 when an image of a marker 61 previously located in a real space is taken by an outer imaging section 23 in the case where a photographing process according to an embodiment is performed.

Next, an outline of a photographing process (image processing) performed in the game apparatus 10 of the present embodiment will be described. FIG. 5 is a diagram illustrating an example of an image which is displayed on the upper LCD 22 when an image of a marker 61 previously located in a real space is taken by the outer imaging section 23 in the case where the photographing process according to the present embodiment is performed.

As shown in FIG. 5, the marker 61 is provided in a real space in the imaging direction of the outer imaging section 23 of the game apparatus 10. The marker 61 is a rectangular sheet of paper, and an arrow is drawn at the center thereof. The long sides of the marker 61 are parallel to the direction of the arrow drawn at the center. The information processing section 31 (the CPU 311) of the game apparatus 10 can detect the marker 61 included in a real image taken by the outer imaging section 23, by performing image processing such as pattern matching on the real image. When the marker 61 is detected in a real image taken by the outer imaging section 23, the real image taken by the outer imaging section 23 is displayed on the upper LCD 22 such that a virtual character is superimposed on the real image. When the marker 61 is not detected in a real image taken by the outer imaging section 23, a message indicating that the marker 61 is not detected is displayed on the upper LCD 22, and no virtual character is displayed thereon.

Specifically, when the marker 61 is detected, virtual characters 51 to 53, a cursor 55, and a display bar 56 are displayed on the upper LCD 22 so as to be superimposed on a real image (an image of a real space including the marker 61 and a background) taken by the outer imaging section 23. The virtual characters 51 to 53 are characters existing in a virtual space, and are virtual objects each representing a person. More specifically, a state where the virtual character 52 stands on the marker 61, is displayed on the upper LCD 22. In addition, the virtual character 51 is displayed on the left side of the virtual character 52 (on the left side on the screen), and the virtual character 53 is displayed on the right side of the virtual character 52 (on the right side on the screen). Note that the cursor 55 indicates a virtual character being selected at the moment, and the display bar 56 is displayed in order to inform the user of how to operate the game apparatus 10.

An image displayed on the upper LCD 22 is a stereoscopically visible image. In other words, a real image taken by the outer imaging section 23 includes: a real image for a left eye which is taken by the outer imaging section (left) 23a; and a real image for a right eye which is taken by the outer imaging section (right) 23b. In addition, images of the virtual characters 51 to 53 are taken by a virtual stereo camera (a left virtual camera and a right virtual camera) existing in the virtual space, and displayed so as to be superimposed on the real image. Specifically, a superimposed image for a left eye is generated by superimposing images of the virtual characters, which are taken by the left virtual camera, on a real image for a left eye, which is taken by the outer imaging section (left) 23a. In addition, a superimposed image for a right eye is generated by superimposing images of the virtual characters, which are taken by the right virtual camera, on a real image for a right eye, which is taken by the outer imaging section (right) 23b. Then, these two superimposed images are displayed on the upper LCD 22, the superimposed image for a left eye is viewed by the left eye of the user through the parallax barrier, and the superimposed image for a right eye is viewed by the right eye of the user through the parallax barrier. Thus, the user can stereoscopically view an image.

Figure 6:
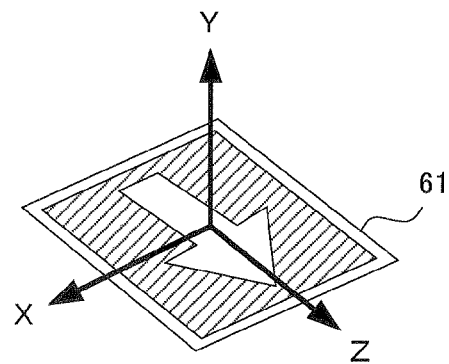
FIG. 6 is a diagram illustrating a definition of a coordinate system in a virtual space.

The virtual characters 51 to 53 are objects located in the virtual space. FIG. 6 is a diagram illustrating a definition of a coordinate system in the virtual space. The virtual space is defined by an XYZ coordinate system (marker coordinate system) having an origin at the center of the marker 61. In the marker coordinate system, a Z axis is set so as to extend in the same direction as that of the arrow on the marker 61, an X axis is set so as to extend rightward (in the right direction) with respect to the arrow direction, and a Y axis is set so as to extend perpendicularly upward (in the upward direction) with respect to the marker 61. When the coordinate system of the virtual space is defined on the basis of the marker 61 located in the real space as described above, the real space can correspond to the virtual space. The virtual characters 51 to 53 are located in the virtual space defined thus. For example, the virtual character 52 is located at the origin (0, 0, 0) of the marker coordinate system, and its facing direction (orientation) is set so as to be a direction obtained by rotating the X axis about the Y axis by 45 degrees. In addition, the virtual characters 51 and 53 are located at predetermined positions on an XZ plane, and their facing directions are set so as to be the same as that of the virtual character 52.

Figure 7:
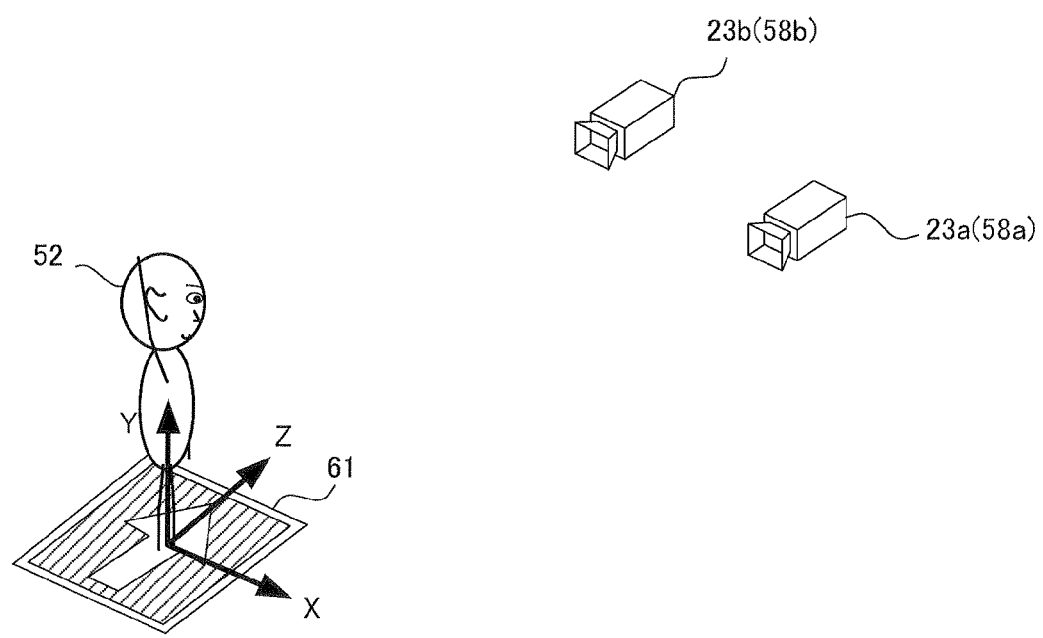
FIG. 7 is a diagram illustrating a state where a virtual character 52 is located in the virtual space.

FIG. 7 is a diagram illustrating a state where the virtual character 52 is located in the virtual space. As shown in FIG. 7, the virtual character 52 is located at the origin of the marker coordinate system, images of the virtual character 52 are taken by a left virtual camera 58*a* and a right virtual camera 58*b* which are located in the virtual space. The left virtual camera 58*a* is used to take an image of the virtual space which is viewed by the left eye of the user, and the right virtual camera 58*b* is used to take an image of the virtual space which is viewed by the right eye of the user. Specifically, the position and the orientation of the left virtual camera 58*a* in the marker coordinate system are caused to agree with the position and the orientation of the outer imaging section (left) 23*a* in the real space. In addition, the position and the orientation of the right virtual camera 58*b* in the marker coordinate system are caused to agree with the position and the orientation of the outer imaging section (right) 23*b* in the real space.

Figure 8:
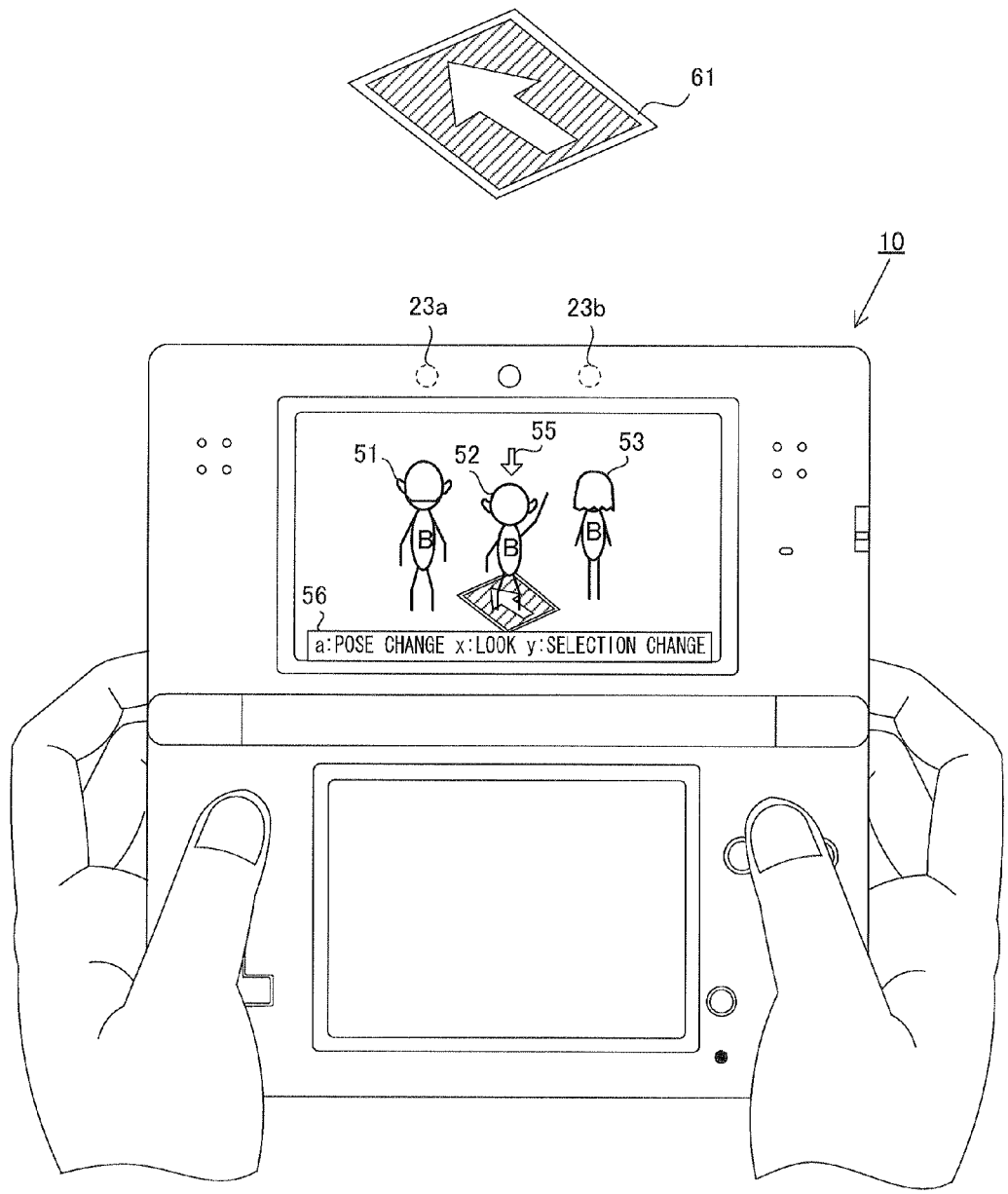
FIG. 8 is a diagram illustrating an example of an image which is displayed on the upper LCD 22 when an image of the marker 61 is taken in the direction opposite to that in FIG. 5.

In the case where the virtual space is defined on the basis of the marker 61 and the virtual characters 51 to 53 are located in the virtual space as described above, when the position and/or the imaging direction of the outer imaging section 23 are changed, the virtual characters 51 to 53 displayed on the upper LCD 22 are also changed. FIG. 8 is a diagram illustrating an example of an image which is displayed on the upper LCD 22 when an image of the marker 61 is taken in the direction opposite to that in FIG. 5. In FIG. 8, an image is shown which is displayed on the upper LCD 22 when the position and the orientation of the game apparatus 10 (the outer imaging section 23) are fixed and the marker 61 shown in FIG. 5 is rotated by 180 degrees about an axis which extends through the center of the marker 61 and which is perpendicular to the marker 61, or an image is shown which is displayed on the upper LCD 22 when the marker 61 shown in FIG. 5 is fixed and the game apparatus 10 is rotated by 180 degrees about the axis which extends through the center of the marker 61 and which is perpendicular to the marker 61.

As shown in FIG. 8, when the positional relation (relative positional relation; distance and orientation) between the game apparatus 10 (the outer imaging section 23) and the marker 61 in the real space is changed, the virtual characters 51 to 53 displayed on the upper LCD 22 are also changed. Specifically, in the positional relation between the game apparatus 10 and the marker 61 as shown in FIG. 5, the front sides of the virtual characters 51 to 53 are displayed, and, in the positional relation between the game apparatus 10 and the marker 61 as shown in FIG. 8 (the direction opposite to that in FIG. 5), the back sides of the virtual characters 51 to 53 are displayed. In other words, when the position and/or the imaging direction of the outer imaging section 23 are changed, the positions and/or the imaging directions of the left and right virtual cameras 58*a* and 58*b* are also changed in response to this change. Thus, the virtual characters 51 to 53 appear as if existing on or around the marker 61 existing in the real space. Note that a display of a virtual character can be changed in accordance with the positional relation between the marker 61 and the game apparatus 10 by using a known augmented reality technique.

Figure 9:
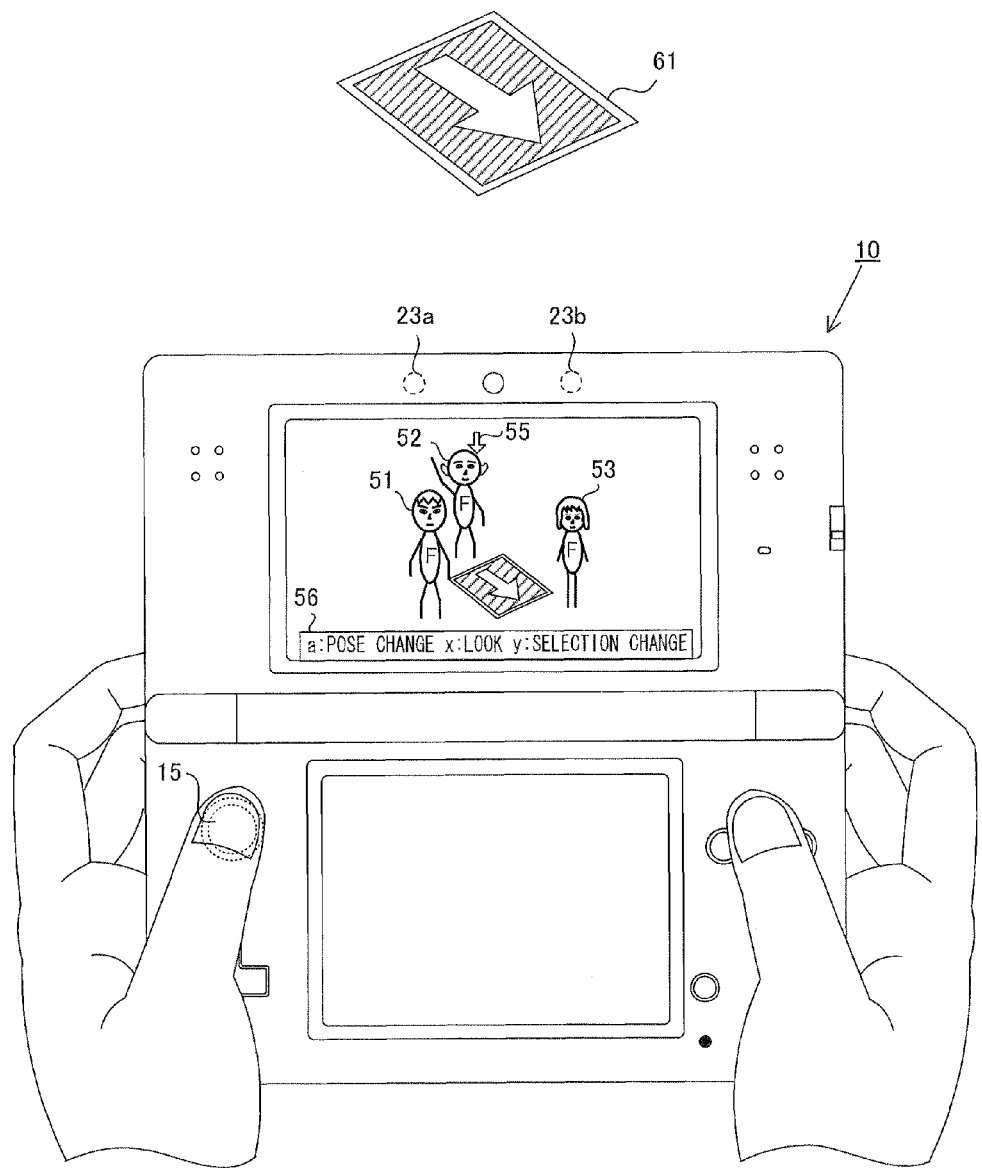
FIG. 9 is a diagram illustrating a state where the virtual character 52 moves in accordance with an operation performed on an analog stick 15.

Next, an operation of a virtual character performed by the user will be described. First, an operation performed by using the analog stick 15 will be described. FIG. 9 is a diagram illustrating a state where the virtual character 52 moves in accordance with an operation performed on the analog stick 15.

As shown in FIG. 9, when the user slides the analog stick 15 in a predetermined direction (instructs a predetermined direction by using the analog stick 15), the virtual character 52 being selected by the cursor 55 moves in this direction. For example, when the user instructs an upward direction by using the analog stick 15 (slides the analog stick 15 upward), the virtual character 52 walks on the XZ plane so as to move in the upward direction of the screen of the upper LCD 22. In addition, for example, when the user instructs a leftward direction by using the analog stick 15, the virtual character 52 walks on the XZ plane so as to move in the leftward direction of the screen of the upper LCD 22. In this case, the virtual character 52 moves on the XZ plane in the virtual space. A moving direction in the virtual space does not necessarily agree with a moving direction on the screen of the upper LCD 22. In other words, a moving direction on the screen of the upper LCD 22 is a moving direction in a display obtained when an image of the virtual space is taken by the virtual camera and displayed on the upper LCD 22. In this manner, the displayed position of the virtual character 52*a* changes in a direction instructed by the user with the analog stick 15.

Figure 10:
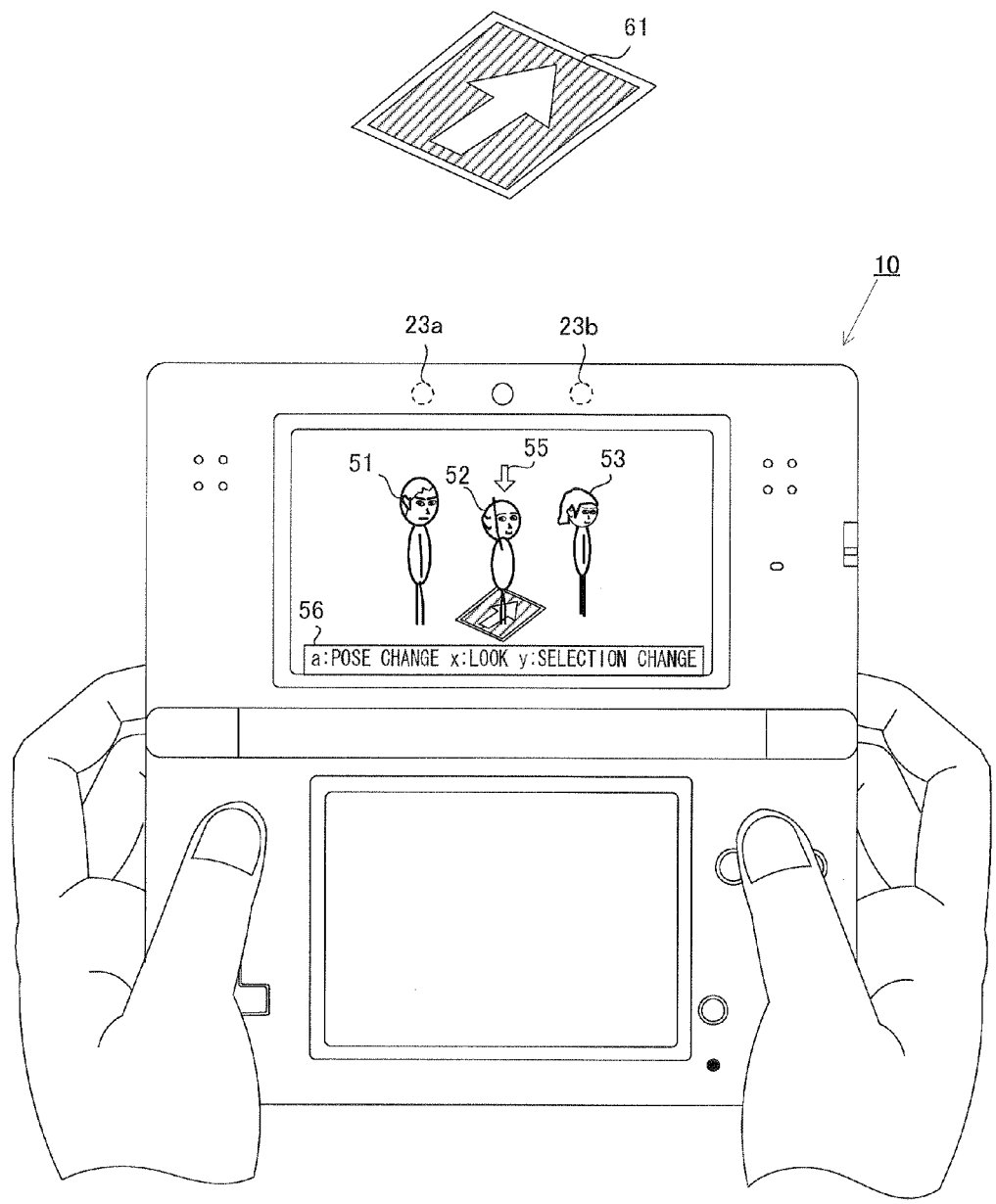
FIG. 10 is a diagram illustrating an example of an image which is displayed on the upper LCD 22 when the virtual character 52 is caused to look in a direction to a virtual camera.

Next, causing a virtual character to look at the game apparatus 10 (the virtual camera) will be described. FIG. 10 is a diagram illustrating an example of an image which is displayed on the upper LCD 22 when the virtual character 52 is caused to look in a direction to the virtual camera. In FIG. 10, a state is shown where, when the marker 61 and the game apparatus 10 (the outer imaging section 23) are located in such a positional relation that the right sides of the virtual characters 51 to 53 are displayed, the virtual characters 51 to 53 look at the virtual camera (58*a* and 58*b*) by an operation performed by the user. As described above, since the position and the orientation of the virtual camera agree with the position and the orientation of the outer imaging section 23, causing the virtual character to look at the virtual camera means causing the virtual character to look at the outer imaging section 23. Specifically, in the case where the right sides of the virtual characters 51 to 53 are displayed as shown in FIG. 10, for example, when the user presses the X button 14D, all the virtual characters 51 to 53 turn their faces to the game apparatus 10. When the virtual characters 51 to 53 look at the virtual camera, the view lines of the virtual characters 51 to 53 are fixed toward the virtual camera, that is, toward the outer imaging section 23. Thus, even when the user moves the game apparatus 10, the virtual characters 51 to 53 always turn their faces to the virtual camera. In other words, when the user presses the X button 14D once, a camera look mode is set, and the virtual characters 51 to 53 always look at the virtual camera. Note that, in the camera look mode, when the user presses the X button 14D again, the camera look mode is released, each virtual character turns its face in a direction corresponding to the facing direction of its body. In this manner, the user can cause the virtual character to look in the direction to the game apparatus 10, by an operation (input) on operation means (input means).

Note that the pose of the virtual character is changed by another operation. For example, when the user presses the A button 14B or the B button 14C, the virtual character being selected changes from a standing state to a sitting state, or puts its hand up or down. In this manner, the user can change the pose of each virtual character. In addition, change of selection of a virtual character is performed by pressing the Y button 14E. For example, when the Y button 14E is pressed once, the cursor 55 moves to above the virtual character 53, and the virtual character 53 is selected.

Further, the facial expression of the virtual character is changed by another operation. For example, when the user presses the rightward or leftward button of the cross button 14A, the selected virtual character gets angry or smiles. In this manner, the user can change the facial expression of each virtual character.

As described above, while looking at the upper LCD 22, the user can change the position, the pose, or the facial expression of each virtual character or can cause the virtual character to look at the camera, by a button operation. The image displayed on the upper LCD 22 changes in real time while the user performs a button operation or moves the game apparatus 10 in the real space. Thus, the user can set the composition of a picture to be taken, freely to some extent by changing the position, the pose, the facial expression, the orientation of each virtual character, the positional relation between the game apparatus 10 and the marker 61, or the like. Then, the user can take (store) an image displayed on the upper LCD 22, by pressing a predetermined button. For example, when the L button 14G or the R button 14H is pressed, an image displayed at the moment when the button is pressed is displayed as a still image on the upper LCD 22, and the still image is stored in a storage buffer (a buffer area provided in the main memory 32 or the like). Then, when the predetermined button is pressed one more time, the still image is stored in nonvolatile storage means (the internal data storage memory 35 or the external memory 44).

As described above, the user can operate the virtual object as if the virtual object exists in the real space, and can take a picture of the virtual object.

(Details of Photographing Process)

Figure 11:
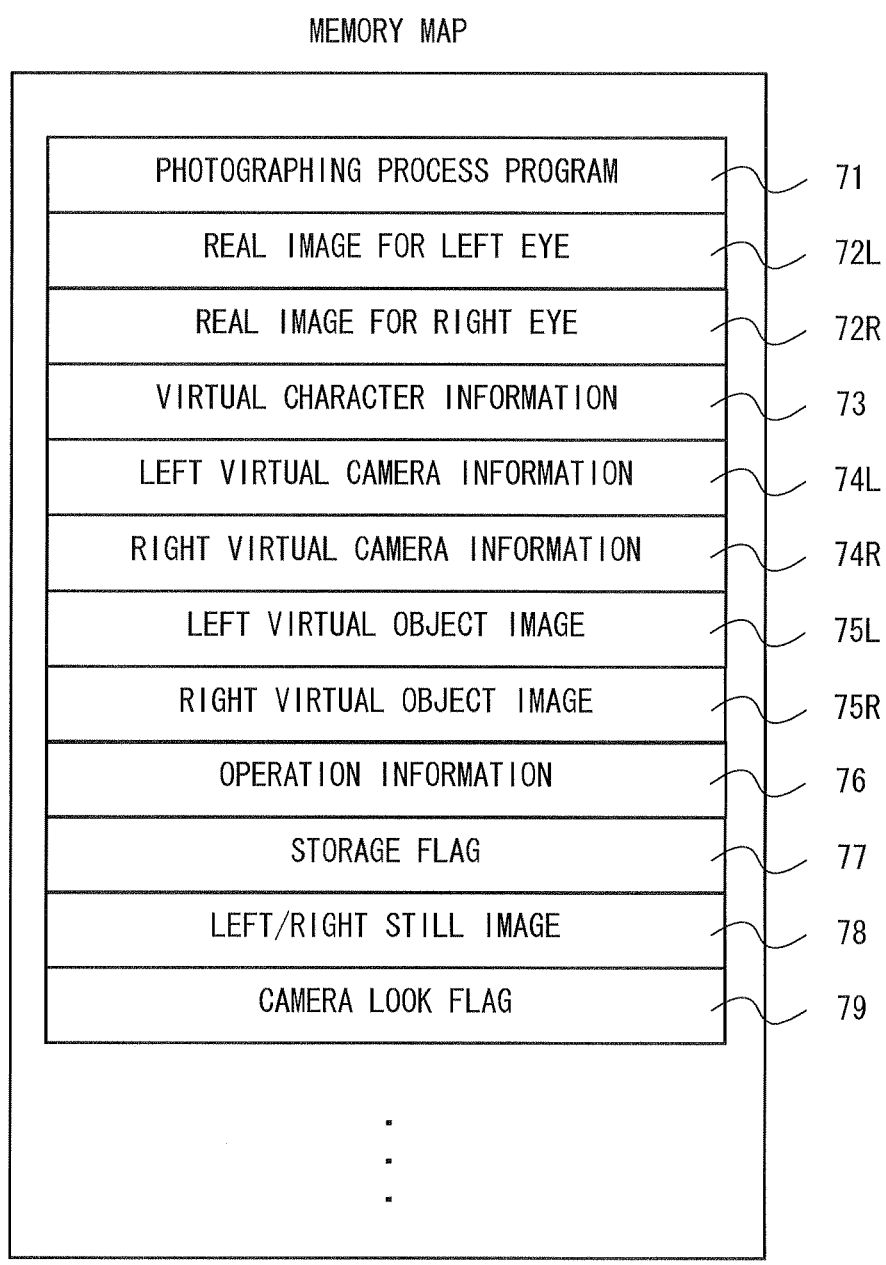
FIG. 11 is a diagram illustrating a memory map of a RAM of the game apparatus 10.

Next, the photographing process according to the present embodiment will be described in detail with reference to FIGS. 11 to 16. First, main data which is stored in the main memory 32 and the VRAM 313 (hereinafter, they may be collectively referred to as RAM) when the photographing process is performed, will be described. FIG. 11 is a diagram illustrating a memory map of the RAM of the game apparatus 10. As shown in FIG. 11, in the RAM, a photographing process program 71, a real image 72L for a left eye, a real image 72R for a right eye, virtual character information 73, left virtual camera information 74L, right virtual camera information 74R, a left virtual object image 75L, a right virtual object image 75R, operation information 76, a storage flag 77, a left/right still image 78, a camera look flag 79, and the like, are stored.

The photographing process program 71 is a program for causing the information processing section 31 (the CPU 311) to perform the photographing process illustrated in later-described flowcharts.

The real image 72L for a left eye is an image of the real space which is taken by the outer imaging section (left) 23a.

The real image 72R for a right eye is an image of the real space which is taken by the outer imaging section (right) 23b.

The virtual character information 73 is information on each of the virtual characters 51 to 53. Specifically, the virtual character information 73 includes three-dimensional model data (polygon data) representing the shape of a virtual character, texture data representing the pattern of the virtual character, information on the position and the orientation of the virtual character in the virtual space, and information indicating whether or not the virtual character is being selected at the moment. Each of the virtual characters 51 to 53 has these pieces of data and information, namely, the three-dimensional model data, the texture data, the information on the position and the orientation, and the information indicating whether the virtual character is being selected at the moment. Note that each virtual character has the three-dimensional model data and the information on the position and the orientation for each part thereof. For example, the virtual character 51 has three-dimensional model data of the body (a part under the neck) thereof, information on the position and the orientation of the body, three-dimensional model data of the head thereof, and information on the position and the orientation of the head. The position of the head and the position of the body have a predetermined relation. Since each virtual character has the above pieces of data and information for each part, the facing directions of the head and the body can be set so as to be different from each other. For example, when the body of the virtual character 51 is located at the origin in the virtual space and faces in the X axis positive direction, the face of the virtual character 51 can be located at a predetermined position shifted from the origin in the Y axis positive direction, and the face can be turned in the Z axis positive direction.

The left virtual camera information 74L is information representing the position and the orientation of the left virtual camera 58a in the virtual space. Specifically, the left virtual camera information 74L is a matrix calculated on the basis of the position and the orientation of the marker 61 in a real image for a left eye.

The right virtual camera information 74R is information representing the position and the orientation of the right virtual camera 58b in the virtual space. Specifically, the right virtual camera information 74R is a matrix calculated on the basis of the position and the orientation of the marker 61 in the real image for a right eye.

The left virtual object image 75L is an image of a virtual character which is taken by the left virtual camera 58a.

The right virtual object image 75R is an image of the virtual character which is taken by the right virtual camera 58b.

The operation information 76 is information indicating an operation performed on the operation means (each of the operation buttons 14A to 14E, 14G, and 14H, and the analog stick 15). When an operation is performed on the operation means, a signal indicating that the operation has been performed is transmitted to the CPU 311, and the operation information 76 is updated therewith.

The storage flag 77 is a flag indicating that a taken image is about to be stored. For example, when a photographing instruction button (the L button 14G or the R button 14H) is pressed, the storage flag 77 is set to be ON.

The left/right still image 78 is an image which is stored in accordance with the photographing instruction button (the L button 14G or the R button 14H) being pressed, and includes a left still image and a right still image.

The camera look flag 79 is a flag indicating whether or not it is in a mode (camera look mode) in which a virtual character looks at the virtual camera. When it is in the camera look mode, the camera look flag 79 is set to be ON. When it is not in the camera look mode, the camera look flag 79 is set to be OFF.

(Description of Main Flow)

Figure 12:
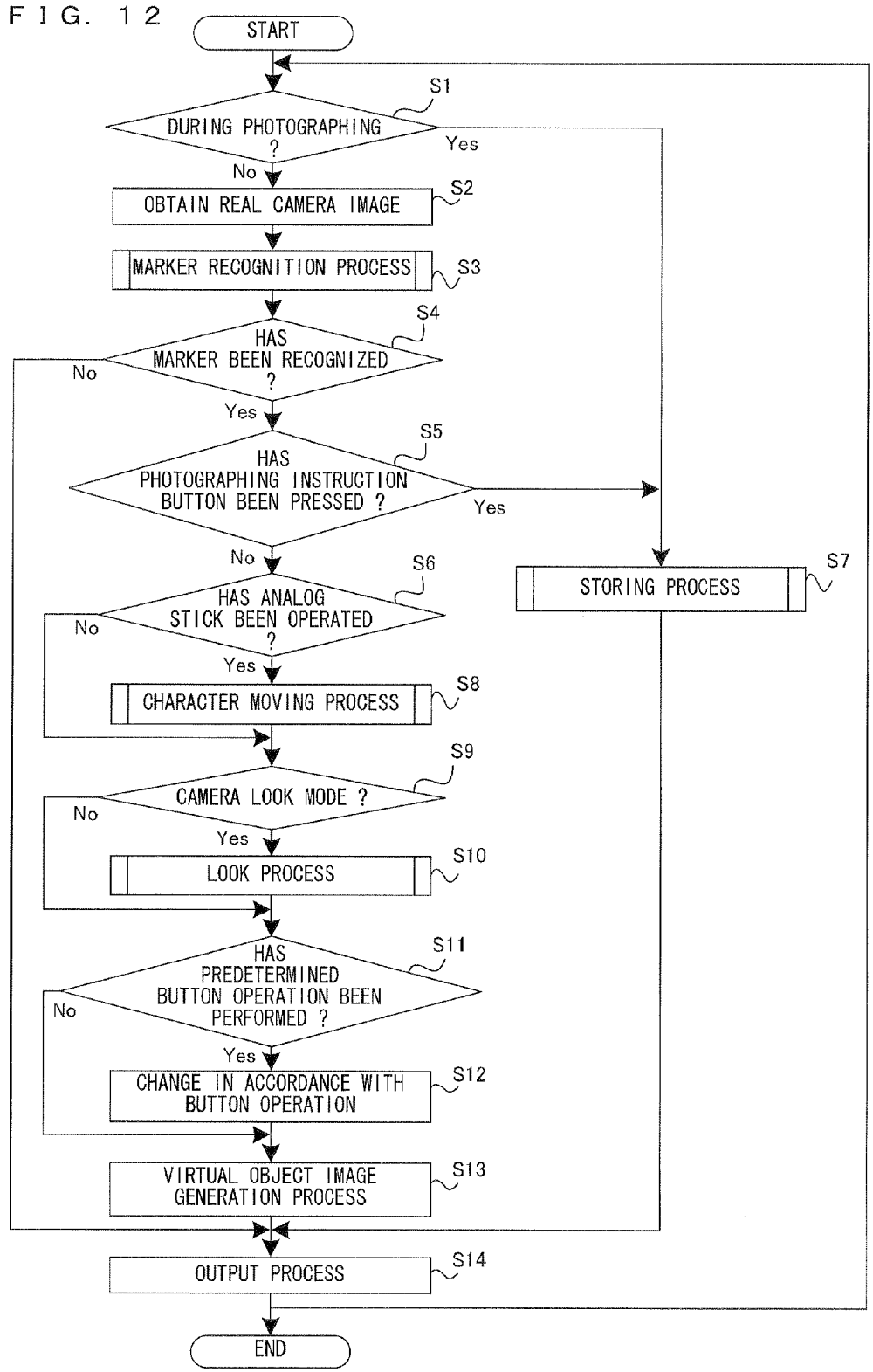
FIG. 12 is a main flowchart illustrating in detail the photographing process according to the embodiment.

Next, the photographing process according to the present embodiment will be described with reference to FIGS. 12 to 16. FIG. 12 is a main flowchart illustrating in detail the photographing process according to the present embodiment. When the game apparatus 10 is powered on, the information processing section 31 (the CPU 311) of the game apparatus 10 executes a boot program stored in a ROM (not shown), thereby initializing each unit such as the main memory 32. Next, the photographing process program stored in the nonvolatile memory (the external memory 44 or the like; a computer-readable storage medium) is loaded into the RAM (specifically, the main memory 32), and execution of this program is started by the CPU 311 of the information processing section 31. After the above process is completed, processes illustrated in the flowchart of FIG. 12 are performed by the information processing section 31 (the CPU 311 or the GPU 321). Note that processes which are not directly relevant to the present invention are omitted in FIG. 12. In addition, a process loop of steps S1 to S14 shown in FIG. 12 is repeatedly executed in every single frame (e.g., 1/30 sec or 1/60 sec which is referred to as a frame time).

First, at step S1, the information processing section 31 determines whether or not it is during photographing. Specifically, the information processing section 31 refers to the RAM and determines whether or not the storage flag 77 is ON. When the result of the determination is negative, the information processing section 31 subsequently performs a process at step S2. On the other hand, when the result of the determination is positive, the information processing section 31 subsequently performs a process at step S7.

At step S2, the information processing section 31 obtains a real camera image. Specifically, the information processing section 31 transmits, to the outer imaging section 23, an instruction for taking an image. In accordance with the instruction, the outer imaging section (left) 23a takes a real image 72L for a left eye, and the outer imaging section (right) 23b takes a real image 72R for a right eye. Then, the information processing section 31 obtains the two taken images (the real image 72L for a left eye and the real image 72R for a right eye) and stores the images in the RAM. Next, the information processing section 31 performs a process at step S3.

At step S3, the information processing section 31 performs a marker recognition process. The marker recognition process is a process of recognizing the marker 61 included in the real image 72L for a left eye and the real image 72R for a right eye which are obtained at step S2, by using these two images. In the marker recognition process, the virtual camera (the left virtual camera 58a and the right virtual camera 58b) is set in the virtual space in accordance with the recognition result of the marker 61. Details of the marker recognition process will be described later. After the marker recognition process, a process at step S4 is performed.

At step S4, the information processing section 31 determines whether or not the marker 61 has been recognized. The process at step S4 is a process of determining whether or not the marker 61 has been successfully recognized in the marker recognition process at step S3. Specifically, the information processing section 31 refers to the RAM and determines whether or not a detection result flag (described later) is ON. When the result of the determination is positive, the information processing section 31 subsequently performs a process at step S5. On the other hand, when the result of the determination is negative, the information processing section 31 subsequently performs a process at step S14.

At step S5, the information processing section 31 determines whether or not a photographing instruction button has been pressed. Specifically, the information processing section 31 refers to the operation information 76 stored in the RAM, and determines whether or not the L button 14G or the R button 14H has been pressed. When the result of the determination is negative, the information processing section 31 subsequently performs a process at step S6. On the other hand, when the result of the determination is positive, the information processing section 31 subsequently performs a process at step S7.

At step S6, the information processing section 31 refers to the operation information 76 and determines whether or not the analog stick 15 has been operated. When the result of the determination is positive, the information processing section 31 subsequently performs a process at step S8. On the other hand, when the result of the determination is negative, the information processing section 31 subsequently performs a process at step S9.

Meanwhile, at step S7, the information processing section 31 performs a storing process. The storing process is a process of storing (taking) an image displayed on the upper LCD 22. Details of the storing process will be described later. After the process at step S7, the information processing section 31 performs the process at step S14.

At step S8, the information processing section 31 performs a character moving process. In the character moving process, the information processing section 31 moves a virtual character in the virtual space in accordance with an operation performed on the analog stick 15. Details of the character moving process will be described later. After the character moving process, the process at step S9 is performed.

At step S9, the information processing section 31 determines whether or not it is in the camera look mode. Specifically, the information processing section 31 refers to the operation information 76 and determines whether or not the X button 14D has been pressed or whether or not the camera look flag 79 is ON. When the result of the determination is positive (when the X button 14D has been pressed, or when the camera look flag 79 is ON), the information processing section 31 sets the camera look flag 79 to be ON, and then performs a look process (described later) shown at step S10. Note that, when the camera look flag 79 is ON and the X button 14D has been pressed, the information processing section 31 sets the camera look flag 79 to be OFF, performs a no-look process (not shown), and then performs a process at step S11. Details of the no-look process are omitted. In the no-look process, the orientation of the head of each virtual character which has been changed in the later-described look process is returned to the original orientation. On the other hand, when the result of the determination at step S9 is negative (when the X button 14D has not been pressed and the camera look flag 79 is OFF), the information processing section 31 subsequently performs the process at step S11.

At step S10, the information processing section 31 performs the look process. The look process is a process of causing each virtual character to look at the virtual camera, that is, a process of turning the face of each virtual character to the virtual camera. Details of the look process will be described later. After the look process, the process at step S11 is performed.

At step S11, the information processing section 31 determines whether or not a predetermined button operation has been performed. Specifically, the information processing section 31 refers to the operation information 76 and determines whether or not any one of the leftward and rightward buttons of the cross button 14A, the A button 14B, the B button 14C, and the Y button 14E has been pressed. When the result of the determination is positive, the information processing section 31 subsequently performs a process at step S12. On the other hand, when the result of the determination is negative, the information processing section 31 subsequently performs a process at step S13.

At step S12, the information processing section 31 performs a process corresponding a button operation. Specifically, when the leftward or rightward button of the cross button 14A has been pressed, the information processing section 31 changes the facial expression of the virtual character being selected. The facial expression of the virtual character is changed by a texture applied to the face of the virtual character. Thus, the information processing section 31 changes the texture being applied at the moment to another texture (previously stored) in accordance with the leftward or rightward button of the cross button 14A being pressed. In addition, when the A button 14B or the B button 14C has been pressed, the information processing section 31 changes the pose of the virtual character being selected. A plurality of poses (a sitting state, a standing state, a hand-raising state, and the like) are previously prepared for each virtual character, and the information processing section 31 selects one pose from among the plurality of poses in accordance with the A button 14B or the B button 14C being pressed. Moreover, when the Y button 14E has been pressed, the information processing section 31 selects another virtual character which is different from the virtual character being selected at the moment. For example, virtual characters are selected in order from right to left in the display, or virtual characters are selected in order in which the virtual characters are determined to be located in the virtual space before the photographing process. Next, the information processing section 31 performs the process at step S13.

At step S13, the information processing section 31 performs a virtual object image generation process. Specifically, the information processing section 31 generates a left virtual object image 75L by taking an image of the virtual space with the left virtual camera 58a, and generates a right virtual object image 75R by taking an image of the virtual space with the right virtual camera 58b. Then, the information processing section 31 stores the taken left virtual object image 75L and the taken right virtual object image 75R in the RAM. Next, the information processing section 31 performs the process at step S14.

At step S14, the information processing section 31 performs an output process. When the output process is performed, a stereoscopically visible image is displayed on the upper LCD 22. Specifically, when the process step S13 has been performed immediately before step 14, the information processing section 31 generates a superimposed image in which the virtual object images generated at step S13 is superimposed on the real camera image obtained at step S2. Specifically, the information processing section 31 generates a superimposed image for a left eye in which the left virtual object image 75L is superimposed on the real image 72L for a left eye, and generates a superimposed image for a right eye in which the right virtual object image 75R is superimposed on the real image 72R for a right eye. Then, the information processing section 31 outputs the two generated superimposed images to the upper LCD 22. Note that, when the cursor 55 and the display bar 56 are set to be displayed, images representing the cursor 55 and the display bar 56 are displayed so as to be superimposed on the left and right real camera images, in addition to the virtual object image. On the other hand, when the cursor 55 and the display bar 56 are set to be non-displayed, the cursor 55 and the display bar 56 are not displayed on the upper LCD 22.

When the result of the determination at step S4 is negative, the information processing section 31 outputs, to the upper LCD 22, the real image 72L for a left eye and the real image 72R for a right eye which are obtained at step S2. When the storage flag 77 is ON (when the process at step S7 has been performed immediately before step 14), the information processing section 31 outputs, to the upper LCD 22, the left and right still images (the left/right still image 78) stored in the RAM at step S7. After the process at step S14, the information processing section 31 performs the process at step S1 again. This is the end of the description of the flowchart shown in FIG. 12.

Although omitted in FIG. 12, in the case where the storage flag 77 is ON, when the still images (the left/right still image 78) are stored in the RAM, the still images are displayed on the upper LCD 22, and then, when the user confirms the contents of the still images and presses a predetermined button, the still images (the left/right still image 78) stored in the RAM are stored in nonvolatile storage means (the external data storage memory 45, the internal data storage memory 35, or the like).

Next, details of each process described above will be described.

(Description of Marker Recognition Process)

Figure 13:
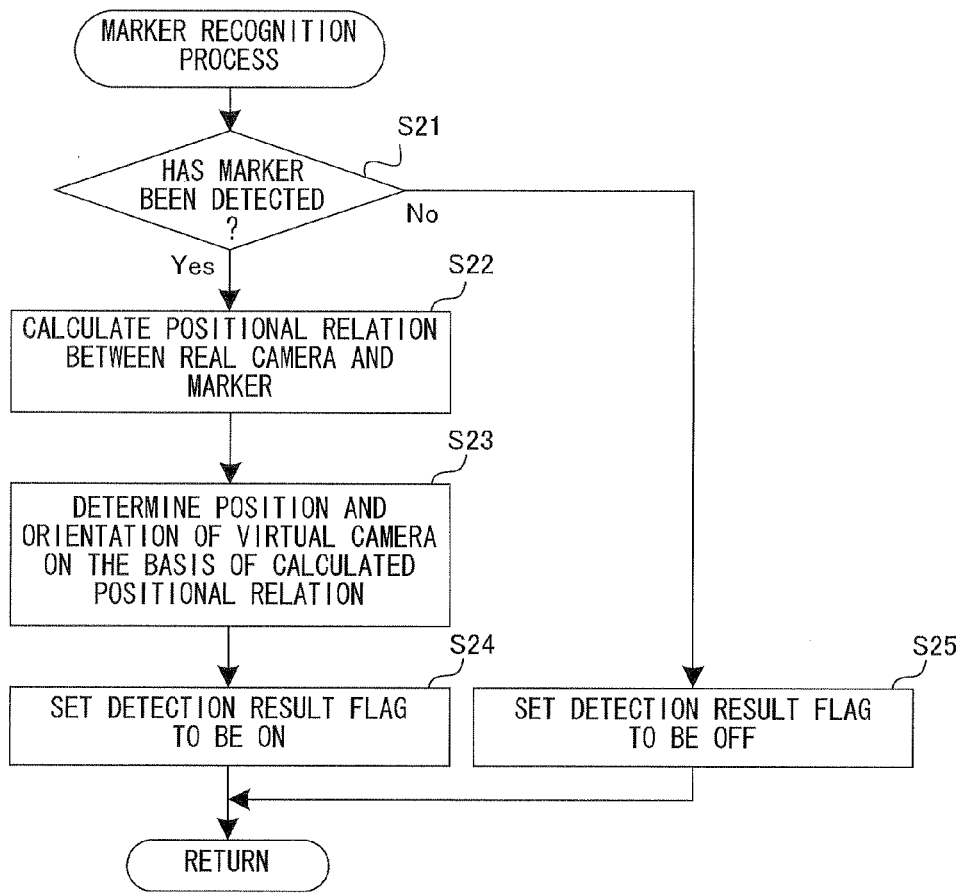
FIG. 13 is a flowchart illustrating in detail a marker recognition process (step S3)

FIG. 13 is a flowchart illustrating in detail the marker recognition process (step S3). First, at step S21, the information processing section 31 determines whether or not the marker 61 has been detected. Here, it is determined whether or not the marker 61 is included in both of the real image 72L for a left eye and the real image 72R for a right eye which are obtained at step S2, by using these two images. Specifically, the information processing section 31 performs image processing such as pattern matching on each image, and determines whether or not the marker 61 is included in each image. When the marker 61 is not included in either one of the images, the result of the determination is negative, and a process at step S25 is subsequently performed. On the other hand, when the marker 61 is included in both of the images, the result of the determination is positive, and a process at step S22 is subsequently performed.

At step S22, the information processing section 31 calculates a positional relation between the real camera and the marker 61. Specifically, the information processing section 31 calculates a positional relation between the outer imaging section (left) 23a and the marker 61 existing in the real space, on the basis of: the position, the size, the shape, in the real image 72L for a left eye, of the marker 61 included in the real image 72L for a left eye; the direction of the arrow on the marker 61; and the like. Here, the positional relation between the outer imaging section (left) 23a and the marker 61 is the three-dimensional position and orientation of one of the marker 61 and the outer imaging section (left) 23a based on the other of the marker 61 and the outer imaging section (left) 23a. In other words, the positional relation is the relative position and orientation of the outer imaging section (left) 23a with respect to the marker 61. Similarly, the information processing section 31 calculates a positional relation between the outer imaging section (right) 23b and the marker 61 existing in the real space, on the basis of: the position, the size, the shape, in the real image 72R for a right eye, of the marker 61 included in the real image 72R for a right eye; the direction of the arrow on the marker 61; and the like.

Figure 17:
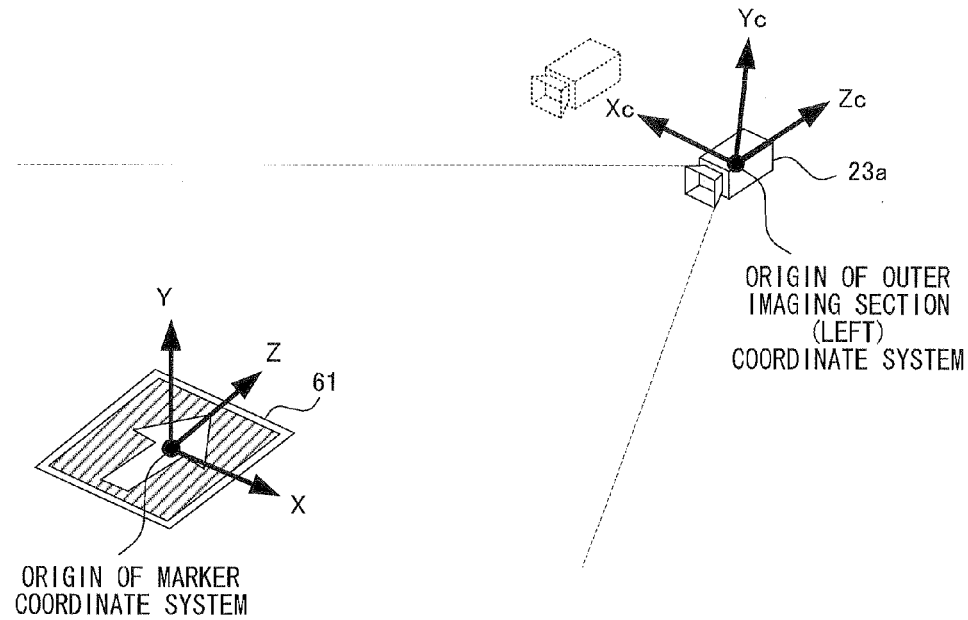

More specifically, at step S22, on the basis of the recognition result of the marker 61, a marker coordinate system is set, and the positional relation between the marker 61 and the outer imaging section (left) 23*a* is calculated. FIG. 17 is a diagram illustrating a positional relation between the marker 61 and the outer imaging section (left) 23*a*. As shown in FIG. 17, a marker coordinate system is set with respect to the marker 61. Specifically, the origin of the marker coordinate system is set at the center of the marker 61. In addition, the Z axis of the marker coordinate system is set so as to be parallel to the direction of the arrow on the marker 61 (set so as to be parallel to the long sides of the marker 61), and the X axis of the marker coordinate system is set so as to be perpendicular to the direction of the arrow and extend rightward with respect to the direction of the arrow (set so as to be parallel to the short sides of the marker 61). Moreover, the Y axis of the marker coordinate system is set so as to extend perpendicularly upward with respect to the marker 61 (set so as to extend in the upward normal direction of the rectangular marker 61). The marker coordinate system is a coordinate system which defines the virtual space, and allows the real space to correspond to the virtual space. In other words, the origin of the marker coordinate system is an origin of the virtual space, and is also the center of the marker 61 in the real space.

Then, a matrix representing the relative position and orientation of the outer imaging section (left) 23*a* with respect to the marker 61 is calculated. As shown in FIG. 17, the matrix representing the position and the orientation of the outer imaging section (left) 23*a* is a coordinate transformation matrix for transforming a coordinate represented in the marker coordinate system in the virtual space into a coordinate represented in an outer imaging section (left) coordinate system based on the position and the orientation of the outer imaging section (left) 23*a*. At step S23, the matrix representing the position and the orientation of the outer imaging section (left) 23*a* is calculated on the basis of the marker 61 included in the real image 72L for a left eye, and a matrix representing the position and the orientation of the outer imaging section (right) 23*b* is calculated on the basis of the marker 61 included in the real image 72R for a right eye.

The outer imaging section (left) 23*a* and the outer imaging section (right) 23*b* are provided such that the imaging directions thereof are parallel to each other and these imaging sections are not rotated about the imaging directions, respectively. In other words, the orientation of the outer imaging section (left) 23*a* and the orientation of the outer imaging section (right) 23*b* always agree with each other. In addition, the outer imaging section (left) 23*a* and the outer imaging section (right) 23*b* are located at a predetermined interval. Thus, for example, when the position and the orientation of the outer imaging section (left) 23 are calculated on the basis of the real image 72L for a left eye, it is possible to calculate the position and the orientation of the outer imaging section (right) 23*b* without using the real image 72R for a right eye. After step S22, the information processing section 31 performs the process at step S23.

At step S23, the information processing section 31 determines positions and orientations of the left and right virtual cameras. Here, the positions and the orientations of the left and right virtual cameras agree with the position and the orientation of the outer imaging section 23. In other words, the position and the orientation of the left virtual camera 58*a* in the virtual space are set so as to agree with the position and the orientation of the outer imaging section (left) 23*a*. In addition, the position and the orientation of the right virtual camera 58*b* in the virtual space is set so as to agree with the position and the orientation of the outer imaging section (right) 23*b*. Specifically, the position and the orientation of the left virtual camera 58*a* is represented as a matrix (a left view matrix), and the matrix which is calculated at step S22 and represents the position and the orientation of the outer imaging section (left) 23*a* is stored as the left virtual camera information 74L in the RAM. Similarly, the position and the orientation of the right virtual camera 58*b* is represented as a matrix (a right view matrix), and the matrix which is calculated at step S22 and represents the position and the orientation of the outer imaging section (right) 23*b* is stored as the right virtual camera information 74R in the RAM. Note that, since the orientation of the outer imaging section (left) 23*a* always agrees with the orientation of the outer imaging section (right) 23*b* as described above, the orientation of the left virtual camera 58*a* also agrees with the orientation of the right virtual camera 58*b*. After step S23, the information processing section 31 performs a process at step S24.

At step S24, the information processing section 31 sets the detection result flag to be ON and stores the state in the RAM. After step S24, the information processing section 31 ends the marker recognition process illustrated in FIG. 13.

Meanwhile, at step S25, the information processing section 31 sets the detection result flag to be OFF and stores the state in the RAM. Here, since the marker 61 is not detected in either one of the real image 72L for a left eye or the real image 72R for a right eye, the detection result flag, indicating the detection result of the marker 61, is set to be OFF. After step S25, the information processing section 31 ends the marker recognition process illustrated in FIG. 13.

(Description of Storing Process)

Figure 14:
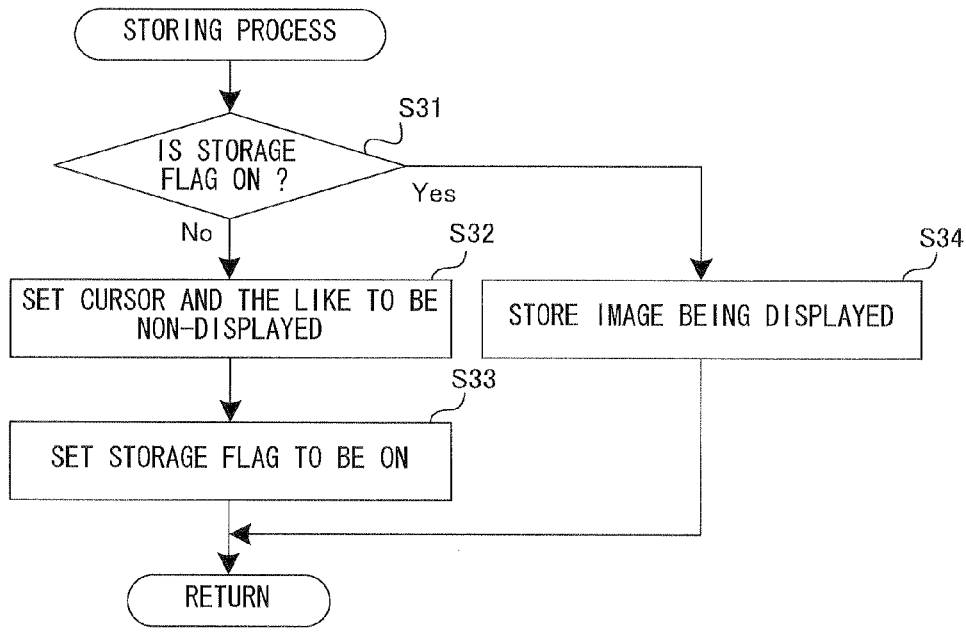
FIG. 14 is a flowchart illustrating in detail a storing process (step S7)

Next, the storing process (step S7) will be described in detail. FIG. 14 is a flowchart illustrating in detail the storing process (step S7).

First, at step S31, the information processing section 31 refers to the RAM and determines whether or not the storage flag 77 is ON. When the result of the determination is negative, the information processing section 31 subsequently performs a process at step S32. On the other hand, when the result of the determination is positive, the information processing section 31 subsequently performs a process at step S34.

At step S32, the information processing section 31 sets the cursor 55 and the like to be non-displayed. Here, the cursor 55 and the display bar 56 are set to be non-displayed. Next, the information processing section 31 performs a process at step S33.

At step S33, the information processing section 31 sets the storage flag 77 to be ON and ends the storing process.

Meanwhile, at step S31, when it is determined that the storage flag 77 has been set to be ON, the information processing section 31 performs the process at step S34. At step S34, the information processing section 31 stores an image being displayed (namely, left and right images) as the left/right still image 78 in the RAM. Note that, when a still image has been already stored in the RAM, the process at step S34 is not performed. The image which is stored here is an image displayed on the upper LCD 22 at the last frame, and is a superimposed image for a left eye and a superimposed image for a right eye in which the cursor 55 and the like are not displayed. After performing the process at step S34, the information processing section 31 ends the storing process.

(Description of Character Moving Process)

Figure 15:
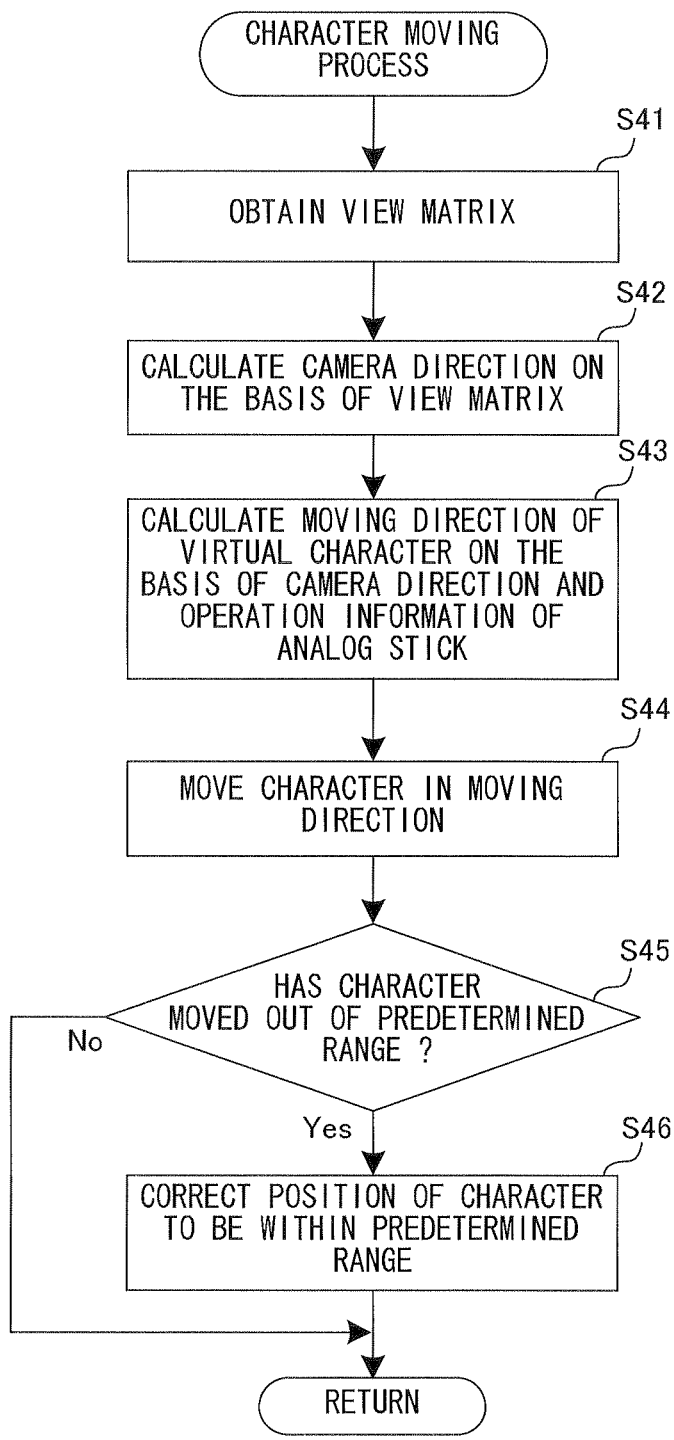
FIG. 15 is a flowchart illustrating in detail a character moving process (step S8)

Next, the character moving process (step S8) will be described in detail. FIG. 15 is a flowchart illustrating in detail the character moving process (step S8).

First, at step S41, the information processing section 31 obtains a view matrix. The view matrix obtained here is a matrix representing the position and the orientation, in the virtual space (XYZ coordinate system), of a virtual camera which is set at the midpoint between the left and right virtual cameras (this virtual camera is actually not set in the virtual space). Specifically, the information processing section 31 calculates the midpoint (values of a coordinate in the marker coordinate system) between the left virtual camera 58a and the right virtual camera 58b on the basis of the left virtual camera information 74L and the right virtual camera information 74R. Then, the information processing section 31 obtains the orientation of the left virtual camera 58a (which agrees with the orientation of the right virtual camera 58b) from the left view matrix, and calculates, as the view matrix, a matrix representing the calculated midpoint and the obtained orientation. Next, the information processing section 31 performs a process at step S42.

Figure 18:
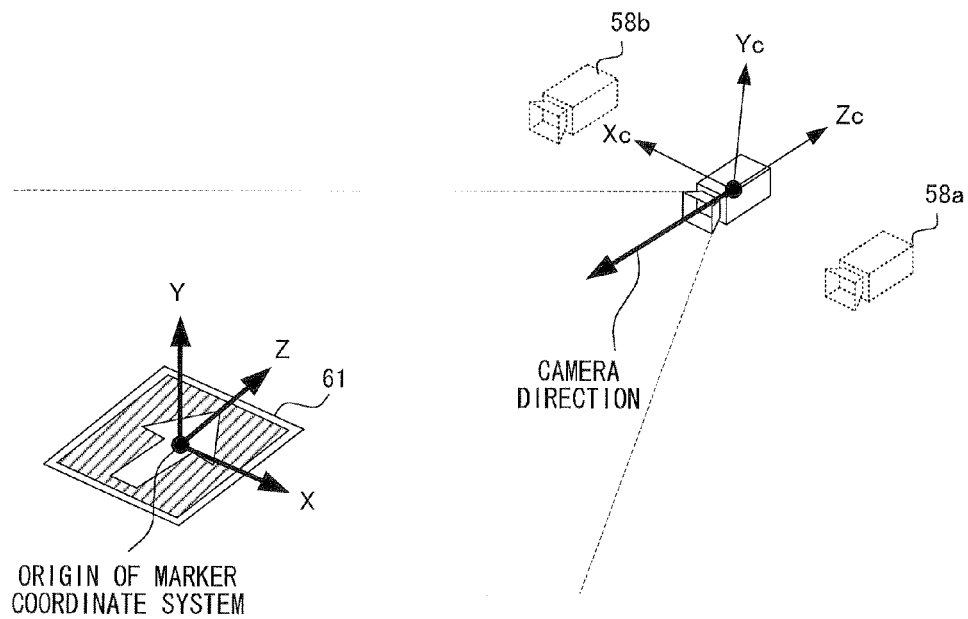
FIG. 18 is a diagram illustrating a camera direction calculated at step S42.

At step S42, the information processing section 31 calculates a camera direction on the basis of the view matrix. The camera direction calculated here indicates the imaging direction of the virtual camera at the midpoint between the left and right virtual cameras (58a and 58b). FIG. 18 is a diagram illustrating the camera direction calculated at step S42. As shown in FIG. 18, the camera direction is the same as the imaging directions of the left and right virtual cameras, and is represented as a vector. Next, the information processing section 31 performs a process at step S43.

Figure 19:
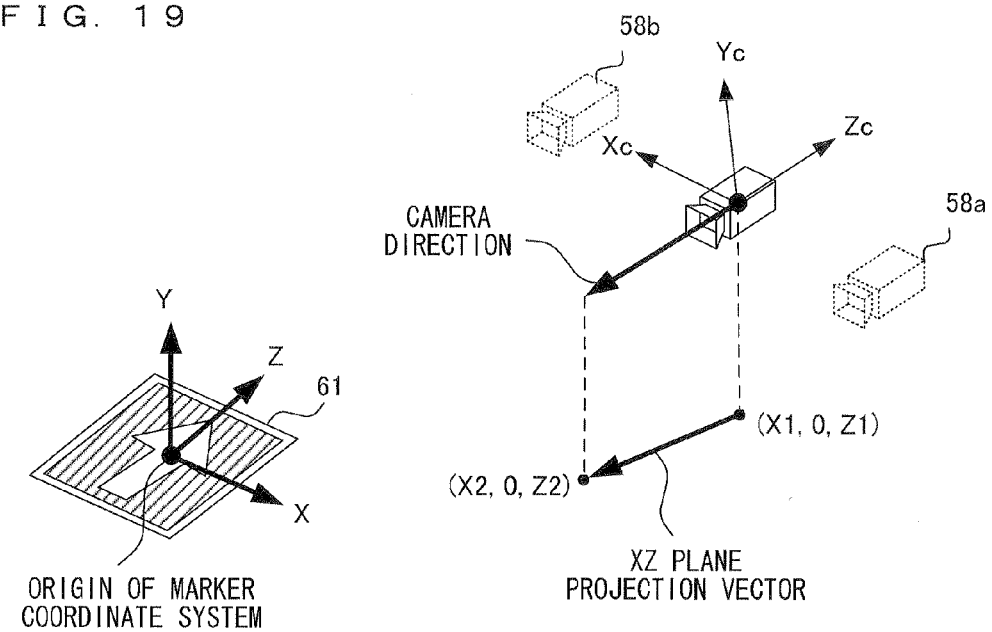
FIG. 19 is a diagram illustrating an XZ plane projection vector obtained by projecting a camera direction vector on an XZ plane.
Figure 20:
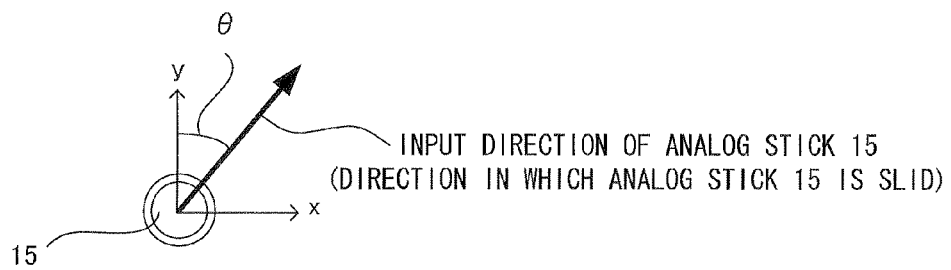
FIG. 20 is a diagram illustrating an input direction of the analog stick 15.

At step S43, the information processing section 31 calculates a moving direction of the virtual character on the basis of the camera direction and operation information of the analog stick 15. Here, a moving direction of the virtual character in the marker coordinate system is calculated. Specifically, first, an XZ plane projection vector obtained by projecting the vector indicating the camera direction, on an XZ plane in the virtual space (marker coordinate system) is calculated. FIG. 19 is a diagram illustrating an XZ plane projection vector obtained by projecting the camera direction vector on the XZ plane. In addition, the information processing section 31 calculates an input direction of the analog stick 15 on the basis of the operation information of the analog stick 15. FIG. 20 is a diagram illustrating an input direction of the analog stick 15. As shown in FIG. 20, the input direction of the analog stick 15 is a direction instructed by the analog stick 15 (a direction in which the analog stick 15 is slid), and is represented as a vector on an xy plane (see FIG. 1). The information processing section 31 refers to the operation information 76 and calculates a vector indicating the input direction of the analog stick 15 as shown in FIG. 20.

Next, the information processing section 31 calculates a moving direction of the virtual character on the basis of the XZ plane projection vector and the input direction vector of the analog stick 15. Specifically, the moving direction is calculated by rotating the XZ plane projection vector about the Y axis in accordance with an input on the analog stick 15. More specifically, the information processing section 31 calculates an angle θ between the input direction vector and the y axis as shown in FIG. 20, and calculates, as the moving direction, a direction obtained by rotating the XZ plane projection vector about the Y axis (see FIG. 19) by the angle θ. In this manner, the information processing section 31 calculates the moving direction of the virtual character.

For example, an upward direction (the upward direction shown in FIG. 1 (the y axis positive direction)) is instructed by using the analog stick 15, the XZ plane projection vector is not rotated (an angle of rotation is 0 degree), and the moving direction becomes the same as the direction of the XZ plane projection vector. In addition, when a downward direction (the downward direction shown in FIG. 1 (the y axis negative direction)) is instructed by using the analog stick 15, the XZ plane projection vector is rotated about the Y axis by 180 degrees, and the moving direction becomes a direction opposite to the direction of the XZ plane projection vector. Moreover, when a rightward direction (the rightward direction shown in FIG. 1 (the x axis positive direction) is instructed by using the analog stick 15, the XZ plane projection vector is rotated about the Y axis by 90 degrees, and the moving direction becomes a rightward direction with respect to the XZ plane projection vector before the rotation.

Figure 21:
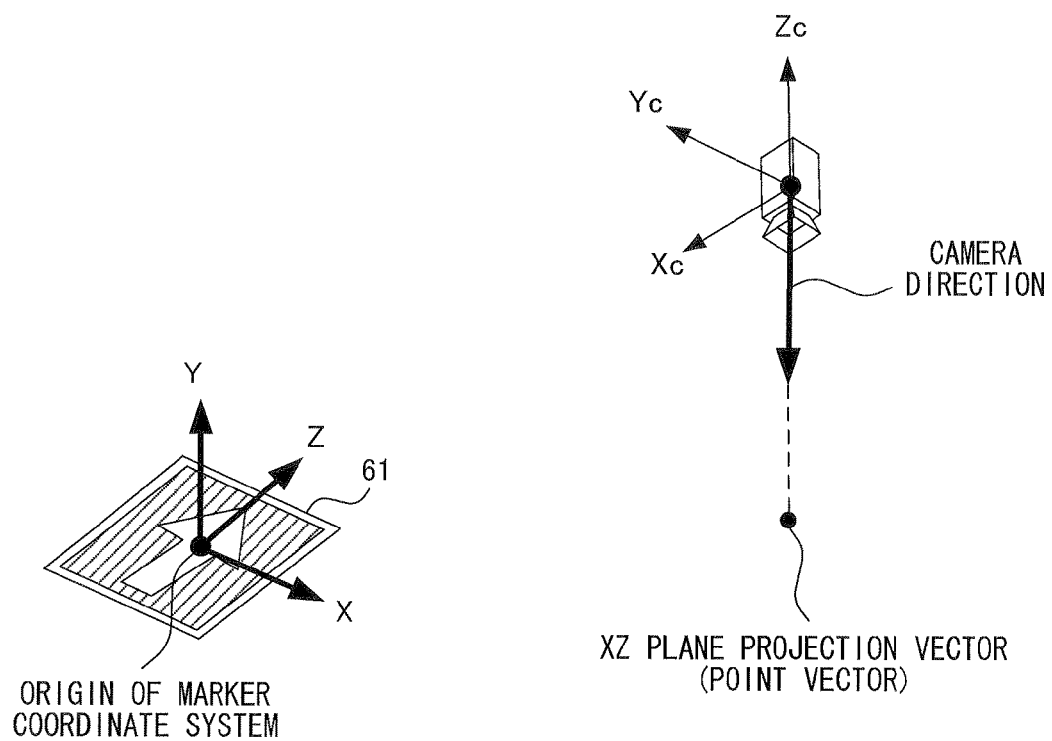
FIG. 21 is a diagram illustrating an XZ plane projection vector when the imaging direction of the virtual camera is parallel to a Y axis.
Figure 22:
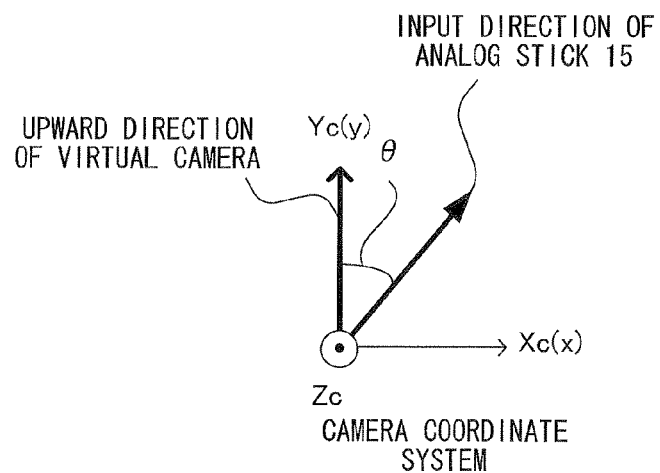
FIG. 22 is a diagram illustrating an upward direction of the virtual camera and an input direction of the analog stick 15 when the imaging direction of the virtual camera is parallel to the Y axis.

Note that, when the camera direction calculated at step S42 is parallel to the Y axis, namely, when the imaging direction of the virtual camera is parallel to the Y axis, the moving direction of the virtual character is not calculated using the camera direction. When an image of the marker 61 is taken from just above the marker 61 by the outer imaging section 23, the camera direction is parallel to the Y axis (the Y axis negative direction). When the camera direction is parallel to the Y axis, the XZ plane projection vector obtained by projecting the camera direction on the XZ plane becomes a point vector which does not have a direction, as shown in FIG. 21. FIG. 21 is a diagram illustrating an XZ plane projection vector when the imaging direction of the virtual camera is parallel to the Y axis. Thus, the moving direction of the virtual character cannot be calculated using the camera direction as described above. Therefore, in this case, an upward direction of the virtual camera (a Yc axis direction shown in FIGS. 19 and 21) is calculated instead of the camera direction (the imaging direction of the virtual camera). FIG. 22 is a diagram illustrating the upward direction of the virtual camera and an input direction of the analog stick 15 when the imaging direction of the virtual camera is parallel to the Y axis. As shown in FIG. 22, the moving direction of the virtual character is calculated on the basis of the calculated upward direction of the virtual camera and the input direction of the analog stick 15. In other words, a vector of the upward direction of the virtual camera is projected on the XZ plane, and a direction obtained by rotating this projected vector about the Y axis of the marker coordinate system by an angle θ (an angle between the upward direction of the virtual camera and the input direction of the analog stick 15) is calculated as the moving direction of the virtual character.

The moving direction calculated thus is a moving direction in the virtual space, namely, a moving direction in the marker coordinate system. When the virtual character moves in the virtual space in the calculated moving direction, the virtual character moves in the same direction as the direction instructed by using the analog stick 15, when being displayed on the upper LCD 22. In other words, the moving direction of the virtual character in the display agrees with the direction in which the analog stick 15 is slid. Next, the information processing section 31 performs a process at step S44.

At step S44, the information processing section 31 moves the virtual character in the moving direction calculated at step S43. Specifically, the information processing section 31 moves the virtual character by updating the position, in the virtual space, of the virtual character being selected, among the virtual characters represented by the virtual character information 73 stored in the RAM. In other words, the information processing section 31 updates the position of the virtual character by adding the vector of the moving direction calculated at step S43 (this vector has a predetermined magnitude), to the position, in the virtual space, of the virtual character being selected, and stores the updated position in the RAM. Next, the information processing section 31 performs a process at step S45.

At step S45, the information processing section 31 determines whether or not the virtual character has moved out of a predetermined range. Specifically, the information processing section 31 determines whether or not the position of the virtual character moved at step S44 is out of a predetermined range having a center at the origin of the marker coordinate system. When the result of the determination is positive, the information processing section 31 performs a process at step S46. On the other hand, when the result of the determination is negative, the information processing section 31 ends the character moving process illustrated in FIG. 15.

At step S46, the information processing section 31 corrects the position of the virtual character to be within the predetermined range. Here, this process is a process for preventing the virtual character from being excessively distant from the origin of the marker coordinate system. When the virtual character is excessively distant from the origin of the marker coordinate system and is out of an imaging range of the virtual camera, the user attempts to take an image of a position distant from the marker 61 by using the outer imaging section 23, in order to see the character. By so doing, the marker 61 is not included in the imaging range of the outer imaging section 23, the marker coordinate system cannot be defined, and the user cannot see the virtual character. In order to prevent such a case, the position of the virtual character moved at step S44 is corrected to be within the predetermined range at step S46. Thereafter, the information processing section 31 ends the character moving process illustrated in FIG. 15.

(Description of Look Process)

Figure 16:
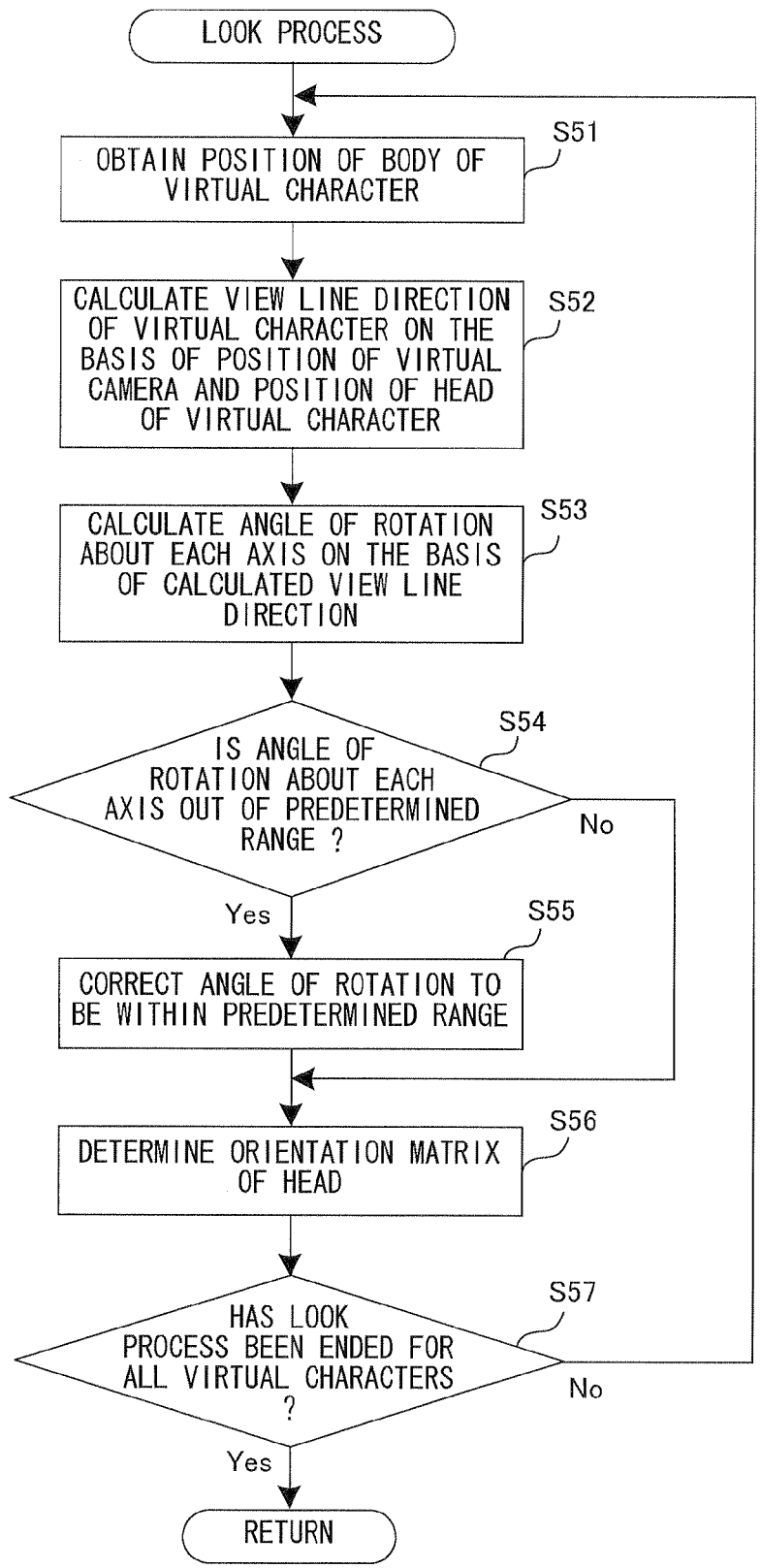
FIG. 16 is a flowchart illustrating in detail a look process (step S10)

Next, the look process (step S10) will be described in detail. FIG. 16 is a flowchart illustrating in detail the look process (step S10). First, at step S51, the information processing section 31 obtains the position of the body of a virtual character. Specifically, the information processing section 31 refers to the virtual character information 73, and obtains the position of the body of any virtual character on which the look process (processes at steps S51 to S56) has not been performed, among a plurality of the virtual characters. As described above, the virtual character information 73 includes, for each virtual character, shape data and the like as well as information on the position and the orientation of each part. The information processing section 31 refers to the virtual character information 73 and obtains the position of the body of the virtual character. Next, the information processing section 31 performs the process at step S52.

Figure 23:
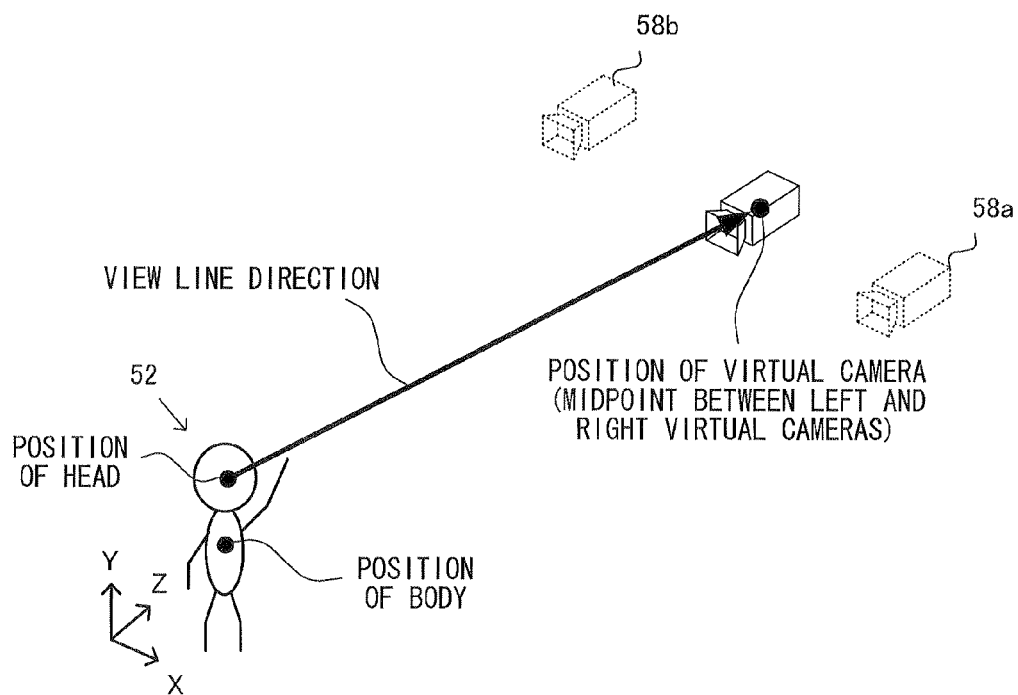
FIG. 23 is a diagram illustrating a view line direction of a virtual character.

At step S52, the information processing section 31 calculates a view line direction of the virtual character on the basis of the position of the virtual camera and the position of the head of the virtual character. FIG. 23 is a diagram illustrating the view line direction of the virtual character. Here, the "position of the virtual camera" is the midpoint between the position of the left virtual camera 58a and the position of the right virtual camera 58b as shown in FIG. 23. Specifically, the information processing section 31 obtains the "position of the virtual camera" (the midpoint between the left and right virtual cameras) on the basis of the view matrix obtained at step S41 (the matrix representing the midpoint between the left and right virtual cameras and the orientation which is same as those of the left and right virtual cameras). In addition, the information processing section 31 calculates the position of the head of the virtual character on the basis of the position of the body of the virtual character obtained at step S51. The body and the head of the virtual character have a predetermined positional relation, and the information processing section 31 calculates the position of the head of the virtual character by adding a predetermined vector to the position of the body of the virtual character. Then, the information processing section 31 calculates a vector having a direction from the position of the head of the virtual character toward the position of the virtual camera, and stores the vector as the view line direction of the virtual character in the RAM. Next, the information processing section 31 performs the process at step S53. Note that the positional relation between the body and the head of the virtual character is different for each pose of the virtual character, and thus the position of the head of the virtual character is calculated in accordance with the current pose of the virtual character.

At step S53, the information processing section 31 calculates an angle of rotation of the head about each axis (X axis and Y axis) on the basis of the view line direction calculated at step S52. Here, angles of rotation about the X axis and the Y axis which are required to turn the head (face) of the virtual character in the view line direction, is calculated. Specifically, the information processing section 31 refers to the virtual character information 73 and obtains a matrix representing the orientation of the body of the virtual character (a current orientation matrix of the body). Next, the information processing section 31 calculates an orientation matrix of the head obtained when the head of the virtual character is turned in the view line direction (an orientation matrix of the head in the view line direction). Then, the information processing section 31 calculates a rotation matrix representing rotation of the head, on the basis of the current orientation matrix of the body and the orientation matrix of the head in the view line direction, and calculates an angle of rotation about each axis (X axis and Y axis) on the basis of the rotation matrix. Next, the information processing section 31 performs the process at step S54.

At step S54, the information processing section 31 determines whether or not the angle of rotation about each axis, which is calculated at step S53, is out of a predetermined range. Specifically, the information processing section 31 determines whether or not the angle of rotation about the X axis (the vertical direction) is out of a predetermined range (e.g., a range of −60 degrees to 60 degrees) and whether or not the angle of rotation about the Y axis (the vertical direction) is out of a predetermined range (e.g., a range of −80 degrees to 80 degrees). When even either one of the angle of rotation about the X axis or the angle of rotation about the Y axis is out of the predetermined range (namely, the result of the determination is positive), the information processing section 31 subsequently performs the process at step S55. On the other hand, when each of the angle of rotation about the X axis and the angle of rotation about the Y axis is not out of the predetermined range (namely, the result of the determination is negative), the information processing section 31 subsequently performs the process at step S56.

At step S55, the information processing section 31 corrects the angle of rotation about each axis to be within the predetermined range. At step S55, when the angle of rotation about each axis is out of the predetermined range, the angle of rotation about each axis is corrected to the upper limit or the lower limit of the predetermined range such that the angle is within the predetermined range. For example, when the angle of rotation about the X axis exceeds the upper limit (60 degrees) of the predetermined range, the information processing section 31 corrects the angle of rotation about the X axis to be the upper limit (60 degrees). By correcting the angle of rotation of the head in this manner, the head can be prevented from unnaturally rotating, for example, rotating horizontally by 180 degrees with respect to the body, or rotating vertically by 150 degrees with respect to the body. Next, the information processing section 31 performs the process at step S56.

At step S56, the information processing section 31 determines an orientation matrix of the head. Specifically, when the angle of rotation of the head has been corrected at step S55 immediately before step S56, the information processing section 31 calculates an orientation matrix of the head obtained when the head is rotated by the corrected angle of rotation. In addition, when the angle of rotation of the head has not been corrected at step S55, the information processing section 31 determines, as a new orientation matrix of the head, the orientation matrix of the head in the view line direction, which is calculated at step S53, and updates the virtual character information 73 therewith. Next, the information processing section 31 performs a process at step S57.

At step S57, the information processing section 31 determines whether or not the look process (the processes shown at steps S51 to S56) has been performed on all the virtual characters. When the result of the determination is negative, the information processing section 31 performs the process at step S51 again. When the result of the determination is positive, the information processing section 31 ends the look process illustrated in FIG. 16.

The processes described above are merely one example, and, for example, the order of the above processes, the button used for each operation, the thresholds used for each determination (the values used at steps S45 and S54), and the like may be any other orders, buttons, and values.

As described above, in the present embodiment, the real space is caused to correspond to the virtual space, and the virtual object is located in the virtual space. An image of the real space is taken by the outer imaging section 23 and an image of the virtual object is taken by the virtual camera, thereby taking a picture which can provide, to the user, a feeling as if the virtual object exists in the real space.

Further, in the present embodiment, the virtual character existing in the virtual space can be moved, the pose of the virtual character can be changed, or the virtual character can be caused to look at the camera, by an operation performed by the user. Thus, a feeling as if the virtual character actually exists in the real space can be provided to the user. For example, the orientation of the face (head) of the virtual character is changed such that the face of the virtual character is turned to the virtual camera (the outer imaging section 23). Thus, a feeling as if the virtual character exists in the real space can be provided. Further, in the present embodiment, since images of the virtual character are taken by the left and right virtual cameras, a stereoscopic image is provided. Then, the orientation of the head of the virtual character is set such that the face of the virtual character is turned to the midpoint between the left and right virtual cameras. Thus, a feeling as if the virtual character exists in the real space can be provided to the user.

Further, when the virtual character is caused to look at the camera, the angle by which the head of the virtual character is rotated is limited within the predetermined range (in the horizontal direction). Specifically, a movable range of the head of the virtual character is limited within a range of −80 degrees to 80 degrees in the horizontal direction and a range of −60 degrees to 60 degrees in the vertical direction. For example, when an image of the virtual character is taken from just behind the virtual character and the virtual character is caused to look at the camera, the face of the virtual character does not face rearward and is turned in an oblique direction (in a direction obtained by rotating the head in the horizontal direction by 80 degrees with respect to the direction of the body). By limiting the angle of rotation of the head in this manner, a feeling as if the virtual character exists in the real space and looks at the camera can be obtained. In other words, in general, the head of a person cannot rotate by 180 degrees to face rearward, and a motion of the virtual character is a natural motion close to a motion of a real person. Thus, a feeling as if the virtual character actually exists in the real space can be provided to the user.

(Modifications)

In the aforementioned embodiment, the virtual characters each representing a person are located as virtual objects in the virtual space. In another embodiment, virtual objects may be any other objects, and, for example, may be objects representing animals, objects representing plants, objects of robots, and the like.

Further, in the aforementioned embodiment, the virtual character is moved, or the pose of the virtual character is changed, by a button operation. In another embodiment, patterns of positions and orientations of a plurality of virtual characters may be previously stored. For example, a pattern in which five virtual characters are arranged in a line and make different poses, respectively, and a pattern in which five virtual characters are arranged to form a pentagon and make different poses, respectively, may be previously stored. Then, the position and the orientation of each virtual character may be changed to a previously stored pattern in accordance with an operation performed by the user.

Further, in the aforementioned embodiment, the virtual character is moved, the facial expression or the pose of the virtual character is changed, or the virtual character is caused to look at the camera, in accordance with the button operation. However, the button operation is merely one example, and setting may be optionally performed regarding what motion is made when each button is pressed. In another embodiment, a plurality of icons for operations may be displayed on the lower LCD 12. An icon may be selected by a touch operation on the screen (the touch panel 13), and the position and the orientation the virtual character, the facial expression of the virtual character, or the like may be changed; or the virtual character may be caused to look at the camera by a touch operation. In still another embodiment, the acceleration sensor 39 and the angular velocity sensor 46 may serve as input means. Specifically, on the basis of detection results of the acceleration sensor 39 and the angular velocity sensor 46, it may be determined whether or not a predetermined gesture operation on the game apparatus 10 (e.g., an operation of moving the game apparatus 10 in the vertical direction, and an operation of tilting the game apparatus 10) has been performed, and, in accordance with the result of the determination, the virtual character may be moved or caused to look at the camera.

Further, in the aforementioned embodiment, the position and the orientation of the virtual character are changed by an operation performed by the user (the character moving process and the look process are performed). In another embodiment, the position or the orientation of the virtual character may be changed by an operation performed by the user (either one of the character moving process or the look process may be performed).

Further, in the aforementioned embodiment, in the look process, the orientation of the face (head) of the virtual character is changed such that the face of the virtual character is turned to the virtual camera. In another embodiment, the entire body of the virtual character may be turned to the virtual camera. In still another embodiment, only the eyes of the virtual character may be turned to the virtual camera without turning the face thereof to the virtual camera, or the arms, the feet, or the like, of the virtual character may be turned to the virtual camera. In other words, in the look process, a part of the body of the virtual character may be turned to the virtual camera.

Further, in the aforementioned embodiment, in the look process, the face of the virtual character is turned to the midpoint between the left and right virtual cameras. In another embodiment, the face of the virtual character may be turned to either one of the left and right virtual cameras.

Further, in the aforementioned embodiment, a stereoscopically visible image (stereoscopic image) is taken and stored. In other words, in the aforementioned embodiment, images of the real space are taken by two cameras (the outer imaging section (left) 23a and the outer imaging section (right) 23b, images of the virtual space are taken by two virtual cameras (the left virtual camera 58a and the right virtual camera 58b), and these images are stored. In another embodiment, a planar image may be taken and stored. In other words, in the other embodiment, an image of the real space may be taken by one real camera, and an image of the virtual space may be taken by one virtual camera.

Further, in the aforementioned embodiment, the positional relation (the relative position and orientation) between the outer imaging section 23 and the marker 61 is calculated by taking an image of the marker 61 with the outer imaging section 23. Then, the virtual space (the marker coordinate system) is defined on the basis of the calculated positional relation. In another embodiment, another object which is different from the marker 61 may be recognized from a taken image, and the positional relation may be calculated. For example, a predetermined object existing in the real space (e.g., a chair, a table, or the like, existing in the real space) may be detected by image recognition such as pattern matching, the positional relation may be calculated, and the virtual space may be defined. In other words, in the other embodiment, a specific object existing in the real space (the marker 61 or the predetermined object) may be recognized from a taken image, and the positional relation between the specific object and the outer imaging section 23 may be calculated. Alternatively, the specific object may be not recognized on the basis of an image taken by a real camera, and may be recognized by other recognition means (e.g., an ultrasonic sensor or the like).

In another embodiment, the position and the orientation of the real camera may be detected by a GPS, and an acceleration sensor, an angular velocity sensor, a geomagnetic sensor, or the like. Then, the position and the orientation of the virtual camera in the virtual space may be set on the basis of the detected position and orientation, and an image of the virtual space which is taken by the virtual camera may be superimposed on an image taken by the real camera. For example, a virtual object may be located at a predetermined position in the virtual space corresponding to the real space, and an image of a position in the real space corresponding to the predetermined position in the virtual space may be taken by the real camera in a predetermined direction. In this case, the position and the orientation of the real camera can be detected by a GPS and orientation detection means (an acceleration sensor, an angular velocity sensor, a geomagnetic sensor, or the like), and the virtual camera can be set in the virtual space such that the position and the orientation thereof agree with the position and the orientation of the real camera. By superimposing the image taken by the virtual camera on the image taken by the real camera in this manner, a picture can be taken in which the virtual object appears as if existing at the corresponding position in the real space.

Further, in the aforementioned embodiment, augmented reality is achieved by using a video see-through technique. In other words, in the aforementioned embodiment, a superimposed image is generated by superimposing an image taken by the virtual camera (the left and right virtual cameras) on an image taken by the outer imaging section 23, and is displayed on the upper LCD 22. In another embodiment, augmented reality is achieved by using an optical see-through technique. For example, the user wears a head mounted display equipped with a camera for detecting a marker provided in the real space, and can view the real space through a display part corresponding to a lens part of a pair of glasses. The display part is formed from a material which allows the user to view the real space therethrough. In addition, the display part is configured such that an image of a virtual object generated by a computer can be displayed thereon.

In another embodiment, the method of the aforementioned photographing process may be applied to any electronic apparatuses other than the game apparatus, such as PDAs (personal digital assistants), highly-functional mobile phones, and cameras (cameras as apparatuses).

Further, in the aforementioned embodiment, the LCD which can display a stereoscopically visible image which can be viewed with naked eyes is used as a display device.

In another embodiment, the present invention is applicable to the case where a stereoscopic display is performed with a pair of glasses such as time-sharing type, polarization type, and anaglyph type (red cyan glasses type).

In another embodiment, a plurality of information processing apparatuses communicably connected to each other via a wired or wireless line are constructed as a photographing process system which implements the aforementioned photographing process method, by dividing each process to be performed by the plurality of information processing apparatuses. For example, the outer imaging section 23 may be separated from an information processing apparatus, and may be connected to the information processing apparatus via a wired or wireless line. Alternatively, the position and the orientation of the outer imaging section 23 may be detected by detection means separated from the information processing apparatus, and the detection result may be transmitted to the information processing apparatus.

Further, in the aforementioned embodiment, the aforementioned processes in the flowcharts are performed by the information processing section 31 of the game apparatus 10 executing a predetermined program. In another embodiment, a part or all of the aforementioned processes may be performed by a dedicated circuit provided in the game apparatus 10.

The photographing process program may be stored in a computer-readable storage medium such as an optical disc and a magnetic disc, other than the above memory, and may be provided to the game apparatus 10. Alternatively, for example, the photographing process program may be stored in a RAM of a server on a network, and the game apparatus 10 may be connected to the network, and the photographing process program may be provided from the server to the game apparatus 10 via the network.

While the invention has been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored therein an image processing program which is executed by a computer of an image processing apparatus which generates an image in which a virtual object image is superimposed on an image taken by a real camera, the image processing program comprising instructions that are, when executed by the computer, configured to:
    obtain a real image of an object which is taken by the real camera;
    obtain position/orientation information corresponding to a position and an orientation of the real camera in a real space;
    set a position and an orientation of a virtual camera in a virtual space on the basis of the obtained position/orientation information;
    change at least one of a position and an orientation of at least a part of a virtual object located in the virtual space in accordance with obtained input, wherein the virtual object is among a plurality of virtual objects located in the virtual space;
    generate a virtual object image in accordance with the set position and orientation of the virtual camera;
    generate a superimposed image in which the generated virtual object image is superimposed on the obtained real image;
    generate a cursor that indicates the virtual object for the superimposed image;
    output, to a display screen, the superimposed image with the cursor included thereon; and
    store the superimposed image to a storage medium as a still photographed image in accordance with a photographing instruction provided by the user, wherein the cursor is not included with the still photograph image stored to the storage medium.

2. The non-transitory storage medium according to claim 1, wherein the instructions are further configured to:
    detect a specific object included in the real image; and
    obtain a relative position and a relative orientation of the real camera with respect to the detected specific object.

3. The non-transitory storage medium according to claim 1, wherein
    the image processing apparatus is connectable to a display device,
    the instructions are further configured to:
        until the photographing instruction is provided, repeatedly generate the superimposed image and output the repeatedly generated the superimposed image to the display device.

4. The non-transitory storage medium according to claim 1, wherein
    the virtual object includes a first part and a second part, and
    the instructions are further configured to change an orientation of the first part such that the first part of the virtual object is turned to the virtual camera in accordance with performed input.

5. The non-transitory storage medium according to claim 4, wherein the instructions are further configured to:
    when the orientation of the first part is changed such that the first part is turned to the virtual camera, set the orientation of the first part to an upper limit or a lower limit of a first range if an orientation of the first part based on the second part is out of the first range.

6. The non-transitory storage medium according to claim 4, wherein the instructions are further configured to repeatedly change the orientation of the first part such that the first part of the virtual object is turned to the virtual camera in accordance with performed input until the photographing instruction is provided.

7. The non-transitory storage medium according to claim 4, wherein
    the real camera is a stereo camera that includes a real camera for the left eye and a real camera for the right eye,
    the real image includes a real image for a left eye and a real image for a right eye taken by respective left and right cameras of the stereo camera,
    the obtained position/orientation information includes a position and an orientation of each of the real camera for left eye and the real camera for a right eye of the stereo camera,
    the virtual camera includes respective left and right virtual cameras that are set in accordance with the position/orientation information,
    the orientation of the first part is changed such that the first part of the virtual object is turned to a midpoint between the left virtual camera and the right virtual camera,
    the generated virtual object image includes a virtual object image for a left eye and a virtual object image for a right eye that are images the virtual object for which the orientation of the first part has been changed, and
    the generated superimposed image includes a superimposed image for a left eye in which the virtual object image for a left eye is superimposed on the real image for a left eye, and a superimposed image for a right eye in which the virtual object image for a right eye is superimposed on the real image for a right eye.

8. The non-transitory storage medium according to claim 1, wherein the instructions are further configured to move the virtual object in accordance with obtained input.

9. The non-transitory storage medium according to claim 3, wherein a moving direction of the virtual object on the display device is the same as a direction of an obtained input.

10. The non-transitory storage medium according to claim 8, wherein the instructions are further configured to correct the position of the virtual object to be within a second range if a position of the virtual object in the virtual space is outside of the second range when the virtual object is moved in accordance with obtained input.

11. The non-transitory storage medium according to claim 1, wherein the instructions are further configured to change a pose of the virtual object in accordance with user provided input.

12. The non-transitory storage medium according to claim 1, wherein the instructions are further configured to select one virtual object from among a plurality of virtual objects located in the virtual space as the object for which the position and/or orientation is changed.

13. An image processing apparatus comprising:
    at least one real camera; and
    a processing system that includes at least one processor, the processing system configured to:
        obtain a real image of an object which is taken by the at least one real camera;
        obtain pose information of the at least one real camera;

set a virtual camera at a position and/or orientation in a virtual space based one the obtained pose information;

change at least one of a position and orientation of at least a part of a virtual object located in the virtual space in accordance with obtained user input;

generate an image of the virtual object, as viewed from the set virtual camera, for which the at least one of the position and the orientation has been changed;

generate a superimposed image in which the image of the virtual object is superimposed on the obtained real image;

for each generated superimposed image, store the respective superimposed image to volatile memory and correspondingly output, to a display screen, respective superimposed image from the volatile memory;

in response to a received photographing instruction, store a separate still superimposed image to a non-volatile memory storage medium, where the separate still image is based on a superimposed image previously stored to volatile memory.

14. An image processing system comprising:

an input device configured to acquire input;

a memory storage medium that includes volatile memory and non-volatile memory;

at least one real camera that is configured to acquire a real image of an object; and a processing system that includes at least one processor, the processing system configured to:

obtain information corresponding to a position and/or orientation of the at least one real camera;

set a virtual camera in a virtual space at a position and/or orientation of a virtual camera based on the obtained information corresponding to a position and/or orientation of the at least one real camera;

change at least one of a position and an orientation of at least a part of a virtual object located in the virtual space in accordance with input received from the input device;

generate an image of the virtual object using the set virtual camera;

generate a superimposed image based on the generated image of the virtual object and the real image;

for each generated superimposed image, store the respective superimposed image to the volatile memory of the memory storage medium and correspondingly output, to a display screen, respective superimposed image from the volatile memory;

receive a photographing instruction based on user provided input; and store, as a result of receiving the photographing instruction, a separate still photographed image to the non-volatile memory that is based on the generated superimposed image stored in volatile memory.

15. An image processing method for generating a still photographed that includes an image of a virtual object image and an image taken by a real camera, the image processing method comprising:

obtaining a real image of an object which is taken by the real camera;

obtaining position/orientation information corresponding to a position and an orientation of the real camera in a real space;

setting a position and an orientation of a virtual camera in a virtual space on the basis of the obtained position/orientation information;

changing at least one of a position and an orientation of at least a part of a virtual object located in the virtual space in accordance with an input performed by a user, wherein the virtual object is among a plurality of virtual objects located in the virtual space;

generating a virtual object image, using the virtual camera, an image of the virtual object of which the at least one of the position and the orientation has been changed;

generating a superimposed image in which the generated virtual object image is superimposed on the obtained real image;

generate a cursor that indicates the virtual object for the superimposed image;

output, to a display screen, the superimposed image with the cursor included thereon; and storing the superimposed image in a memory storage medium as a still photographed image in accordance with a photographing instruction provided by the user, wherein the cursor is not included with the still photograph image stored to the storage medium.

16. The system of claim 14, wherein the memory storage medium is a non-volatile storage medium.

17. The system of claim 14, further comprising:

a display device configured to display other generated superimposed images while the still photographed image is stored in the memory storage medium.

18. The system of claim 14, further comprising:

a display device, wherein the processing system is further configured to:

continually update the generated superimposed image in accordance with user provided instructions for adjusting the virtual object and then output the updated superimposed image to the display device; and receive the photographing instruction while the generated superimposed image is being continually updated and output to the display device.

* * * * *